(12) United States Patent
Adams

(10) Patent No.: US 7,430,689 B1
(45) Date of Patent: Sep. 30, 2008

(54) COUNTER-INVASIVE SOFTWARE SYSTEM AND METHOD

(76) Inventor: Phillip M. Adams, 313 Pleasant Summit Dr., Henderson, NV (US) 89012

( * ) Notice: Subject to any disclaimer, the term of this patent is extended or adjusted under 35 U.S.C. 154(b) by 1210 days.

(21) Appl. No.: 10/728,061

(22) Filed: Dec. 4, 2003

Related U.S. Application Data

(63) Continuation of application No. 10/335,132, filed on Dec. 31, 2002, now abandoned, which is a continuation-in-part of application No. 09/969,176, filed on Oct. 1, 2001, now Pat. No. 7,251,752.

(51) Int. Cl.
*G06F 11/00* (2006.01)
*G06Q 10/00* (2006.01)

(52) U.S. Cl. .................................. 714/39; 713/188

(58) Field of Classification Search ............. 714/37–39, 714/47; 713/187, 188, 190–194
See application file for complete search history.

(56) References Cited

U.S. PATENT DOCUMENTS

| | | | |
|---|---|---|---|
| 5,355,487 A * | 10/1994 | Keller et al. ................. 717/127 |
| 5,564,108 A * | 10/1996 | Hunsaker et al. ............... 702/65 |
| 6,026,442 A | 2/2000 | Lewis et al. ................. 709/229 |
| 6,216,112 B1 | 4/2001 | Fuller et al. ................... 705/14 |
| 6,463,468 B1 | 10/2002 | Buch et al. ................. 709/219 |
| 7,251,752 B2 * | 7/2007 | Adams .......................... 714/38 |
| 7,266,810 B2 * | 9/2007 | Karkare et al. .............. 717/130 |
| 7,363,237 B1 * | 4/2008 | Adams .......................... 705/1 |
| 2004/0122940 A1 * | 6/2004 | Gibson et al. ............... 709/224 |

* cited by examiner

*Primary Examiner*—Nadeem Iqbal
(74) *Attorney, Agent, or Firm*—Pate Pierce & Baird

(57) ABSTRACT

A method and apparatus for detecting, curing and remedying invasive software installation inadvertently, negligently, or intentionally marketed by a vendor. A party may procure a product that sends back invasive data to a source. A testing regimen may identify and defeat sources of any invasive executables found. Accordingly, a party may identify those software packages deemed invasive, and may optionally provide a solution to either defeat or monitor them, where practicable. An independent developer may obtain intellectual property rights in the testing, solution or both of the counter-invasive software system or product. An independent developer may become a supplier of testing or solution systems, motivating a supplier by one of several mechanisms. The developer or damaged party may obtain a legal status with respect to the vendor or of a host of software as a customer, user, clients, shareholder, etc., in order to exercise rights and remedies or provide motivation to a vendor who does not take responsibility for its actions as executed by its marketed products.

32 Claims, 20 Drawing Sheets

468

```
Selection of Terms and Language — 469
         ↓
┌─────────────────────────────┐
│ Standardize Format    470   │
│  ┌───────────────────────┐  │
│  │        Size           │  │
│  └───────────────────────┘  │
│  ┌───────────────────────┐  │
│  │       Content         │  │
│  └───────────────────────┘  │
│  ┌───────────────────────┐  │
│  │      Language         │  │
│  └───────────────────────┘  │
│  ┌───────────────────────┐  │
│  │    Organization       │  │
│  └───────────────────────┘  │
│  ┌───────────────────────┐  │
│  │        • • •          │  │
│  └───────────────────────┘  │
└─────────────────────────────┘
         ↓
Exceeding Boring Length   471
         ↓
Unobtrusive Modification  472
         ↓
Implementation of Terms   474
         ↓
```

FIG. 12

COUNTER-INVASIVE SOFTWARE SYSTEM AND METHOD

RELATED APPLICATIONS

This patent application is a continuation of U.S. patent application Ser. No. 10/335,132 filed on Dec. 31, 2002 now abandoned and entitled COUNTER-INVASIVE SOFTWARE SYSTEM AND METHOD, which is a continuation-in-part of U.S. patent application Ser. No. 09/969,176, filed on Oct. 1, 2001 now U.S. Pat. No. 7,251,752 and entitled COMPUTERIZED PRODUCT IMPROVEMENT APPARATUS AND METHOD.

BACKGROUND

1. The Field of the Invention

This invention relates to computerized methods for testing and tracking and, more particularly, to novel systems and methods for testing, tracking, and correcting effects of software or hardware systems arising from faulty programming, faulty manufacture, or inappropriate and invasive programming.

2. Background

Product development cycles have become shorter and shorter. More of the responsibility for testing and "debugging" products falls to the actual beta testers or alpha testers. Nevertheless, products are continuing their development cycle well into their marketing bases.

For example, software is often released for public purchase before the known errors from beta testing have been cured. Hardware is often likewise premature, and more difficult to correct. Alternatively, beta testing may be inadequate, leaving various problems extant within either hardware, software, or a combination thereof.

Purchasers are often left with a need for identification and cure of errors in commercially available software and hardware. In some instances, product manufacturers and suppliers actively solicit comments, improvements, detection and identification of errors, and the like. In other situations, manufacturers and marketers of products are not so forthcoming.

For example, occasionally, problems are comparatively esoteric, and may occur only in a few rare conditions or instances. Nevertheless, some errors occur with sufficient regularity as to seriously encumber users unaware of the existence of such product flaws.

In recent years, computer and software manufacturers have been repeatedly surprised, even amazed, at the groundswell of opposition to products that are not adequately tested, supported, corrected, recalled, or otherwise identified as having correctable flaws.

Software, in particular, has arrived at a new threshold of pain for purchasers and users. Never since the advent of government agencies for consumer protection against fraud, product failure, product inadequacy, manufacturer non-responsiveness, and the like, have so many dollars of product value been subject to such massive amounts of owner and operator time in order to obtain the purported benefits of the products.

Some manufacturers are swift to seek out and post notification of errors existing in their products. Typically, errors are identified, with associated patches for correcting the errors. In some cases, products are recalled. With the advent of the world wide web, a host of users may provide a corresponding host of error corrections, all freely available to users interested in improving the performance or reliability of a purchased software or hardware product in the computer industry.

Historically, a manufacturer or other purveyor of a computer-related product may face a dilemma with respect to certain product flaws. To the extent that an error, built into or programmed into a computer-related product, is comparatively esoteric and unlikely to cause problems for the majority of users, a manufacturer or developer may prefer to ignore it. To the extent that such a flaw or error is ubiquitous and likely to cause pervasive and obvious problems, a manufacturer may prefer to cure the problem. Similarly, to the extent that a problem is likely to cause a comparatively small disruption of promised service, a manufacturer may choose to ignore it. Alternatively, to the extent that a problem is likely to cause serious economic damages to a commercial or industrial user of a software product or physical damage to persons or property as a direct result of the failure of a computer-based product, a manufacturer will take appropriate steps to find a correction to the problem, announce the presence of the flaw and the availability of a corrective measure, and seek to bring all copies of the product into compliance with a corrected version thereof.

Nevertheless, product improvement is largely a matter of motivation. Motivation may arise from personal interest, individual or enterprise-wide frustration, desirability of a result, previous experiences and expectations, and the like. In current process for product improvement, little incentive exists to provide for skilled third parties to improve marketed products. By the same token, manufacturers, whether large or small, may have limited motivation, resources, or the like to locate and correct errors. In fact, a certain motivation may exist to not seek out errors, nor to highlight them, nor even to repair them, in many instances.

What is needed is a mechanism, whereby software and hardware products related to computer systems may be improved profitably by third parties. Likewise, what is needed is an apparatus and method for consistently providing the necessary resources for testing, correction, notification, and product redistribution for products and upgrades related to computer-related based products, whether software or hardware.

Other difficulties with software originate from purveyors and producers of "invasive software". Invasive software typically provides various opportunities for the developers or sellers of software to obtain information from a computer of a user. For example, "cookies" are commonly understood data structures that hold certain user identification information that may be useful to a software supplier. The proliferation of cookies has become epidemic. Many users are unaware of the number of cookies being used by software and relied upon by software vendors. Likewise, users are less aware of the frequent internet contacts made to transfer information from cookies back to central computers owned by parties other than the software users.

New licensing language in certain software actually requests of users to provide sweeping authorization for software providers to install over the internet certain software extraneous to the principal offer of purchase. The software license asks consent for the purpose of collecting whatever information the seller or manufacturer chooses. These various types of invasive software may include reporters that report information back that users may not be aware is being reported back. Moreover, such software installation done extraneously to the basic software installation may even be as aggressive as moles that execute searching functions to determine information on the user's computer in order to report that information back to the software installer, vendor, or producer.

What is needed is a system and method for preventing and defeating the installation of unwarranted, unwanted, or undesirable software executables and data structures on computers of users. Defeating cookies, reporters, and moles may be a high priority for various parties owning sensitive proprietary information.

Moreover, many professional organizations such as corporations, government bodies, government regulatory agencies, administrative agencies, educational organizations, health maintenance organizations, medical practices, insurance companies, financial institutions, law offices, and the like, maintain, as a matter of course, extremely sensitive, proprietary, and confidential information. That information is not properly disclosed to third parties.

Third-party software installations or licenses request of a software user the broad sweeping right to install cookies, reporters, or moles. Such installations may be imposed over the internet, or from installation software initially, and the confidential information of clients and customers may thus be compromised. A software user may therefore be liable for the breach of confidentiality. Meanwhile, the software originally installed, which may have given rise to the subsequent or concurrent installation of spurious invasive software, has breached and caused the software user to breach duties to clients and customers.

A system and method are needed to remedy these breaches, and to hold accountable those who perpetrate through form contracts and licenses broad, overreaching purported rights to install invasive software on the system of a user and to obtain thereby confidential information of the user or customer and clients of a user.

BRIEF SUMMARY AND OBJECTS OF THE INVENTION

In view of the foregoing, it is a primary object of the present invention to provide a method and process for improving products, and particularly computer-related products by independent third parties. In certain embodiments, apparatus and methods in accordance with the invention may include obtaining a product from a vendor and testing the product for functionality and for defects in operation. Evaluation, after finding a defect, may include testing to determine a source for defects located in the product. Thereafter, a testing regimen may be developed to instances of the product containing the defect or fault.

Consistent with the foregoing objects, and in accordance with the invention as embodied and broadly described herein, a method and apparatus are disclosed. Certain embodiments of apparatus and methods in accordance with the invention may include solutions to hardware defects, software defects, or both. In certain embodiments, a method and apparatus in accordance with the invention may provide solutions in hardware or software effective to return a defective part to service, in order to serve without having the defect, or without having the condition exist giving rise to the defect.

In certain embodiments, the faulty product may be hardware or software. In certain preferred embodiments, the solution to faulty hardware defects may be provided by software configured to override, circumvent, or otherwise avoid states or conditions of the hardware giving rise to the defect. Thus, the defective operation of the hardware may be avoided by implementation of software in accordance with the invention.

In certain embodiments, a third party may assess a defect and a number of products, or the types of products affected by the defect in manufacturing or design, in order to provide a severity profile reflecting the extent to which the product has been distributed, or to which damage may have occurred to purchasers of the product. A third party, possessing information related to the severity profile corresponding to a defect, as well as methods of testing and optionally curing defects in products, may notify a vendor and develop a liability profile reflecting the extent to which a vendor may be responsible for the defect, with knowledge, or as a result of negligence.

Since some defects may affect the health or lives of persons, liability may be extreme, and may relate primarily to numbers of failures, independent of knowledge. In certain embodiments, a method may include providing a solution to a vendor in order to correct defects in products manufactured and provided by the vendor. Solutions may be selected from modifications to the product, instructions sets provided to a vendor, to a user, or to both, instructing on the steps for curing the defect, or publishing a solution to be implemented by an owner (e.g. user) who has or may purchase the product.

In certain embodiments, solutions may be entitled to intellectual property rights. Similarly, testing processes and methods may be entitled to intellectual property rights. Accordingly, in certain circumstances, it may be appropriate that the process will include obtaining intellectual property rights. Subsequent licensing of intellectual property rights may be directed to purchasers of products or owners of products having a desire to individually license, or may involve licensing to vendors of defective products in order to correct defects in stock or previously sold instances of the product.

In certain circumstances, a third party developer of testing processes and apparatus, or solution apparatus and processes, may take steps to obtain a legal relationship with a vendor, thus imposing a duty on the vendor to the third party. In this manner, a third party provider may become a second party with respect to a vendor as a first party in a legal relationship giving rise to rights and remedies to the formerly third party developer of solutions and testing.

A developer may provide information identifying a defect to a vendor, and, if available, existence of a solution available to the vendor. Thus, a vendor may be motivated to purchase and provide a test to users, or solution. For example, if a vendor cannot solve a problem, and desires only to recall, then a testing regimen may be extremely important. Alternatively, if a solution exists, then a field repair may be executed by a user, by an agent of a vendor, or other entity in accordance with the provided solution. Thus, a vendor may be motivated to provide testing or repairs in order to maintain customer satisfaction. In the event that a vendor is unconvinced of the risk, cost, liability, and so forth of leaving users unsupported against an embedded defect, the developer may demand that a vendor, cure the defect from a position of a legal relationship established as a customer, or the like.

Other systems and methods may provide software and processes to defeat and remedy the harms of invasive software.

In one embodiment, a process may include entering into an agreement and monitoring compliance of a vendor with the agreement in curing defects in accordance with obligations under the agreement. Alternatively, a developer may provide motivation from any suitable quarter including providing motivation to acknowledge and cure defects by taking steps toward obtaining a legal judgment. For example, one may file suit, may provide information to those positioned to file suit, or may take a status placing one in a position to file suit to enforce an agreement, or to motivate a vendor or manufacturer to enter into an agreement.

In certain embodiments, apparatus and methods in accordance with the invention may be embodied in hardware. In other embodiments, solutions may be embodied in software. In certain instances, a defect embodied in the hardware may actually be solved by a solution embodied strictly in software. In this kind of instance, careful programming may be able to circumvent certain activities, by selective execution of test instructions, provision of data, or other activities that may trigger activities by a processor, thereby allowing intervention by software in the originally intended operation of hardware or software. Thus, a problem may actually be solved entirely by an outside software solution. In certain embodiments, a process in accordance with the invention may be embodied in a set of data structures providing operational data, executable data, or both configured in a computer-readable medium to be executable by a processor.

In certain instances, a vendor may acknowledge a problem, yet assert its own ability detect a defect and cure the defect. In such an instance, a developer may contract with a vendor, causing the vendor to provide an alternative solution, and warrant the validity of the solution to provide a test and warrant the validity of the test. In such an event, a developer may continue to procure and test products provided by the vendor in order to monitor compliance and assure compliance with the agreement.

In certain embodiments, software systems and enforcement methods or remedy methods may be implemented in accordance with the invention in order to defeat invasive software. For example, various methods of uninstalling, publishing warnings, and bypassing invasive software may be implemented by users provided with sophisticated detection and defense software in accordance with the invention. Various approaches to spoof, block, disable, bypass, or otherwise neutralize the effects and functioning of invasive software may be executed in accordance with the invention.

Moreover, reflexive counter measures may also be included such as trapping the invaders who have improperly installed software, overreached in licensing themselves the right to install invasive software, or who have captured through invasive software inappropriate confidential information. In certain circumstances, typically in law enforcement and government agency work where judicial authorization may be obtained, counter-attacking systems may be possible to effectively wiretap or affirmatively attack systems that are collecting or using stolen confidential information.

In addition, processes may include curing the technical defects of software, and legally or administratively remedying the harms perpetrated by such invasive software. Various remedies may include governmental action, individual actions, class actions, shareholder actions, support by skilled counter-invasive software companies, and the like in order to defeat the effects of invasive software. Actions may be direct or indirect by any particular entity intent on remedying the harms caused by invasive software.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 12 is a schematic block diagram of a process typically used or perceived to be used by software vendors;

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 20, is not intended to limit the scope of the invention, as claimed, but is merely representative of the presently preferred embodiments of the invention.

The presently preferred embodiments of the invention will be best understood by reference to the drawings, wherein like parts are designated by like numerals throughout. Those of ordinary skill in the art will, of course, appreciate that various modifications to the structures detailed in the Figures may easily be made without departing from the essential characteristics of the invention, as described. Thus, the following description of FIGS. 1-0 is intended only by way of example, and simply illustrates certain presently preferred embodiments consistent with the invention as claimed herein.

Figure 1:
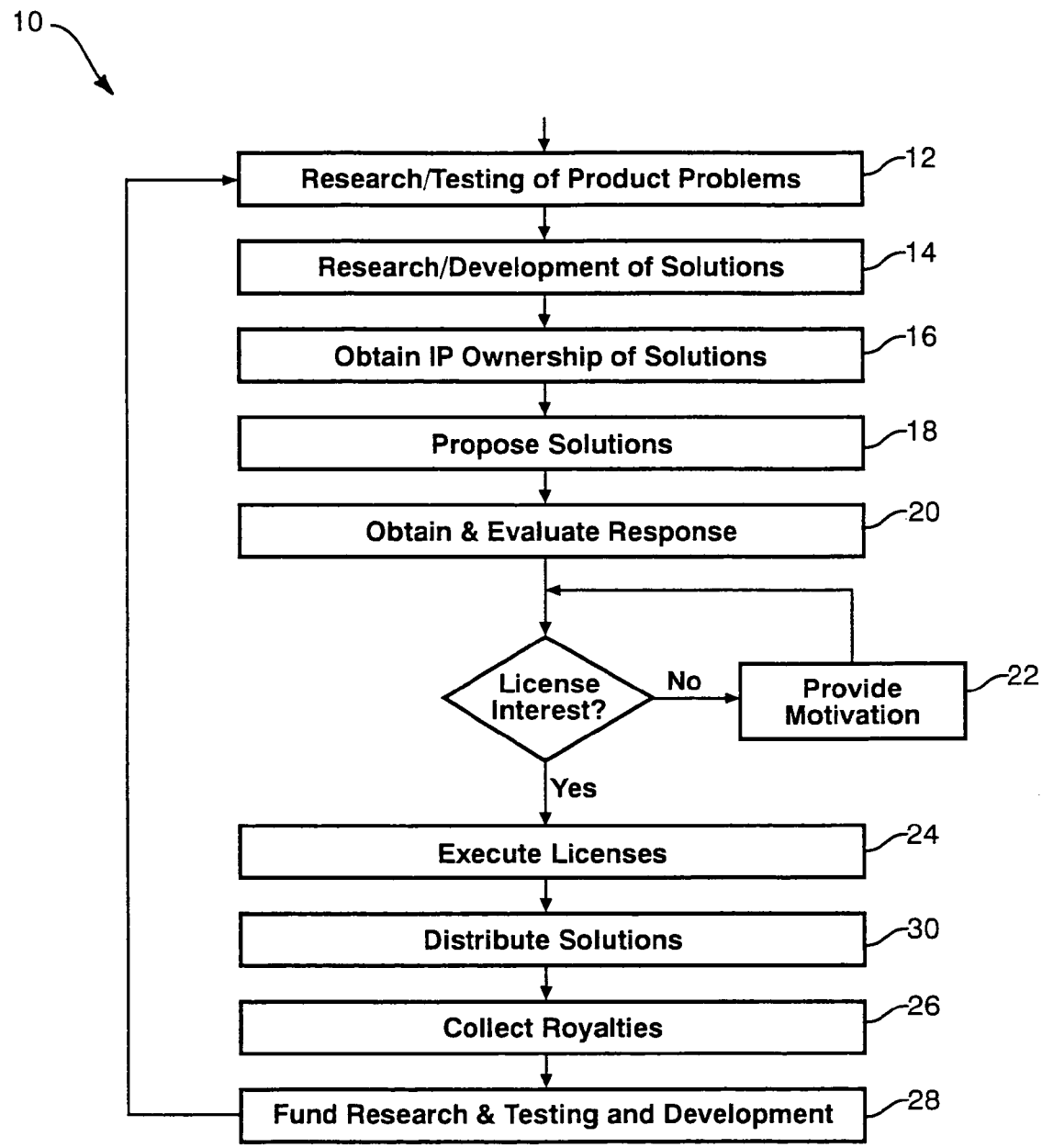
FIG. 1 is a schematic block diagram of one embodiment of a process in accordance with the invention.

Referring to FIG. 1, a process 10 may be embodied as one or several steps. The steps may be executed multiple times, and some steps may be executed in the order illustrated, or in another order as appropriate.

Nevertheless, a process 10 may include an evaluation process or step 12, a development step 14, a securement 16 of intellectual property related to solutions, a proposal 18 proposing solutions to an original vendor, manufacturer, provider, or developer of a product under study, and an evaluation 20 of a response obtained from the responsible party originally providing the product in questions.

In general, research, testing, evaluation, and the like may be embodied in a step 12 regarded as an evaluation 12. Evaluation, involves evaluation on the merits of a product designed, configured, fabricated, constructed, or otherwise put forth as capable of providing some functionality or implementing some duty on behalf of an owner or user. Testing in modern hardware and software systems in sometimes extensive, and sometimes adequate. That is, testing may be extensive and yet inadequate in much of the software and hardware available in the marketplace.

In other instances, standardized testing is available, but the commensurate skills are not implemented or otherwise applied to the problem. By whatever mechanism, products may be placed in the marketplace by vendors, suppliers, manufacturers, developers, and the like obtaining money for those products, whether hardware or software. The products may or may not comply with the fundamental functionality expected by an owner or purchaser. Likewise, the promised functionality may exist, but may have failures periodically or at various times.

In other circumstances, a condition imposed by a user may create a condition not foreseen by a manufacturer, vendor, supplier, or developer, thus causing either a failure of the product to provide the intended solution or functionality, or a failure of the product in some other mode. A failure by a product in a mode not testable, or known to a user, may lead to consequential damages to the user of the computer.

For example, in certain instances, a user may have a program crash, or a program may create bad information or data from an analysis, or other process. Likewise, a product, such as a computer may be responsible to provide information, which information may be provided inaccurately, to a wrong location, or the information itself may be wrong. In financial information, failure of a computer to provide correct financial information may cause a failure of a transaction, or more significantly, an incorrect transaction, not detected by the system itself, due to some flaw therein.

A process of development 14 may involve research, development, or any of the technical processes normally associated with preparing solutions to a problem. Whereas the evaluation process 12 involves identification of the existence of problems, as well as identification of the source of such problems, the development process 14 involves finding and implementing methodologies for temporarily or permanently resolving or avoiding problems identified by the evaluation process 12. Some of the potential outcomes of a development process 14 may be alternative software, testing programs, hardware patches, software applications suitable for circumventing hardware problems, and the like. In certain embodiments, a development process 14 may fail, requiring users to either suffer through with a flaw, or avoid using a product in certain conditions. Alternatively, where a flaw goes to the fundamental purpose of a product, a failure in the development 14 of a solution may require that a test be done to determine which products must be recalled and replaced.

In certain embodiments, the development process 14 may involve development of a testing regimen. For example, the evaluation process 12 may identify failures of a system to perform adequately, or to perform consistently, or without adverse impact on the systems in which the product is embedded or relied upon. In such a circumstance, the development process 14 may be unable to use, or the testing regimen may be impractical to use for an individual user, or for anyone in the field. Accordingly, the development process 14 may develop a testing regimen or application suitable for distribution for use by service people, users, owners, and the like in order to identify products that would contain flaws found during the evaluation process 12.

As a consequence of the development 14, new methods, processes, applications, hardware, and the like may result. Accordingly, a securement process 16 or securement step 16 may secure to an independent developer, independent from the original providers, manufacturers, sellers, and so forth associated with the product in question, the intellectual property rights to proprietary tests, solutions, and so forth developed during the processes of evaluation 12 and development 14. Intellectual property ownership may include patents, certifications, copyrights on materials, and so forth. The securement step 16 may be ongoing and may involve one or more products, depending on the applicability of the testing regimen, solutions methodology, hardware, software, and so forth.

In accordance with one embodiment of a method and apparatus in accordance with the invention, a proposal step 18 may involve presentation to entities responsible for sales, distribution, manufacturing, and so forth of a subject project. The presentations may provide information regarding the evaluation process 12, the development process 14, outputs resulting from evaluation 12 and development 14, presentation of proposed solutions, presentation of data, and additional information relating to business issues.

For example, during the evaluation step 12, a technical evaluation of a product, its failures, and the sources of its failures may be augmented by business or industrial data relating to the prevalence of such defective products, the prevalence of the type associated with the defective product, and so forth.

Accordingly, the proposal 18 may involve providing the context of the problem, the context of the business implications of the product to those involved in the manufacturing, supply, and distribution chain, as well as the possible, probable, or likely implications of the failure of the product with respect to the businesses that rely on the product. For example, it is very likely that a failure of a significant product in some aspect of its conventional or expected performance may give rise to consequential damages against parties knowing the significance, importance, and reliance associated with the product provided.

Whether the proposal 18 is provided as a report, a paper, a letter, or a discussion, an evaluation 20 of the response obtained may be in order. For example, a party or entity in the distribution chain may be more or less believing. Likewise, such an entity may be more or less concerned by the degree of liability. A company may regard liability as extreme and the probability of the liability ever arising comparatively small. Likewise, a company may regard the probability of the fault being detected very high and the net liability low. Accordingly, various responses may be provided for evaluation 20.

Accordingly, the evaluation 20 may lead to a test 21 determining whether or not a licensing interest exists on the part of a particular party in the distribution chain associated with the product. If no licensing interest exists, then a motivation step 22 may be appropriate.

For example, a company may need to understand the position of competitors. Likewise, the position of purchasers may be significant. In some events, only a threat of legal action will be found persuasive. In the legal arena, action may be based on the risks to a purchaser, class action based on risk to a class of purchasers, a false claims act based on providing faulty products to government agencies, with a degree of negligence, false representations, or knowledge of defects, and the like.

Following the proposal 18, parties notified of the defects, the ability to detect defects, and possibly the ability to cure defects are on notice that further providing of faulty products is thereafter done with knowledge.

Accordingly, at a minimum, future products should be corrected. Previous products, provided without knowledge of the defect, or knowledge of and ability to detect to cure the defect, may provide less liability. Accordingly, either through persuasion, additional information, combining of additional statistics, proposing solutions to other downstream entities within the supply chain, or the like may provide motivation 22 encouraging a license interest satisfying the test 21. Similarly, legal action may be part of the motivation 22 provided to a responsible (liable) entity within the supply chain corresponding to a subject faulty product.

On the other hand, once the test 21 is answered positively, execution 24 of a license, or licensing 24 may proceed. Licensing may involve licensing of any or all rights to intellectual property associated with testing, solutions, or the like arising out of the evaluation step 12 or development step 14. In some instances, the licensing process 24 may include settlement of legal actions arising out of the motivation step 22. Accordingly, licensing 24 may be a generalized agreement process 24 in which threatening motivations from the motivation process 22 are removed, as part of the overall exchange of value between the independent developer and the entity in the supply chain having liability.

In accordance with the licensing process 24, the supplying entity may distribute solutions 30. In certain embodiments, the liable parties in the supply processes may prefer that the third-party developer responsible for the development process 14 provide the distribution step 30. By whatever means, the third-party developer collects royalties 26 based upon the distribution 30 of solutions.

In this context, solutions may be merely tests, applications to conduct tests, information on how to conduct tests, software for solving a problem, hardware patches, and the like. Any combination of solutions which tends to ameliorate the problem caused by the effective product may be embodied in a solution distributed 30 to users and owners of defective products previously distributed. Similarly, distribution 30 may involve distributing solutions to those holding stocks of faulty products, and to those parties still in the process of manufacturing products which might otherwise be faulty without the solutions provided. Distributing 30 may also involve recalling products. Accordingly, royalties 26 flow to the developer as a consequence of the value provided in the solutions distributed 30. In one embodiment, a process 10 may include a funding step 28 in which all or a portion of royalties collected 26 are fed back into an evaluation step 12 to research, test, evaluate, and otherwise assess other products, as well as possible compliance issues with respect to products embodying the solution under license.

Figure 2A:
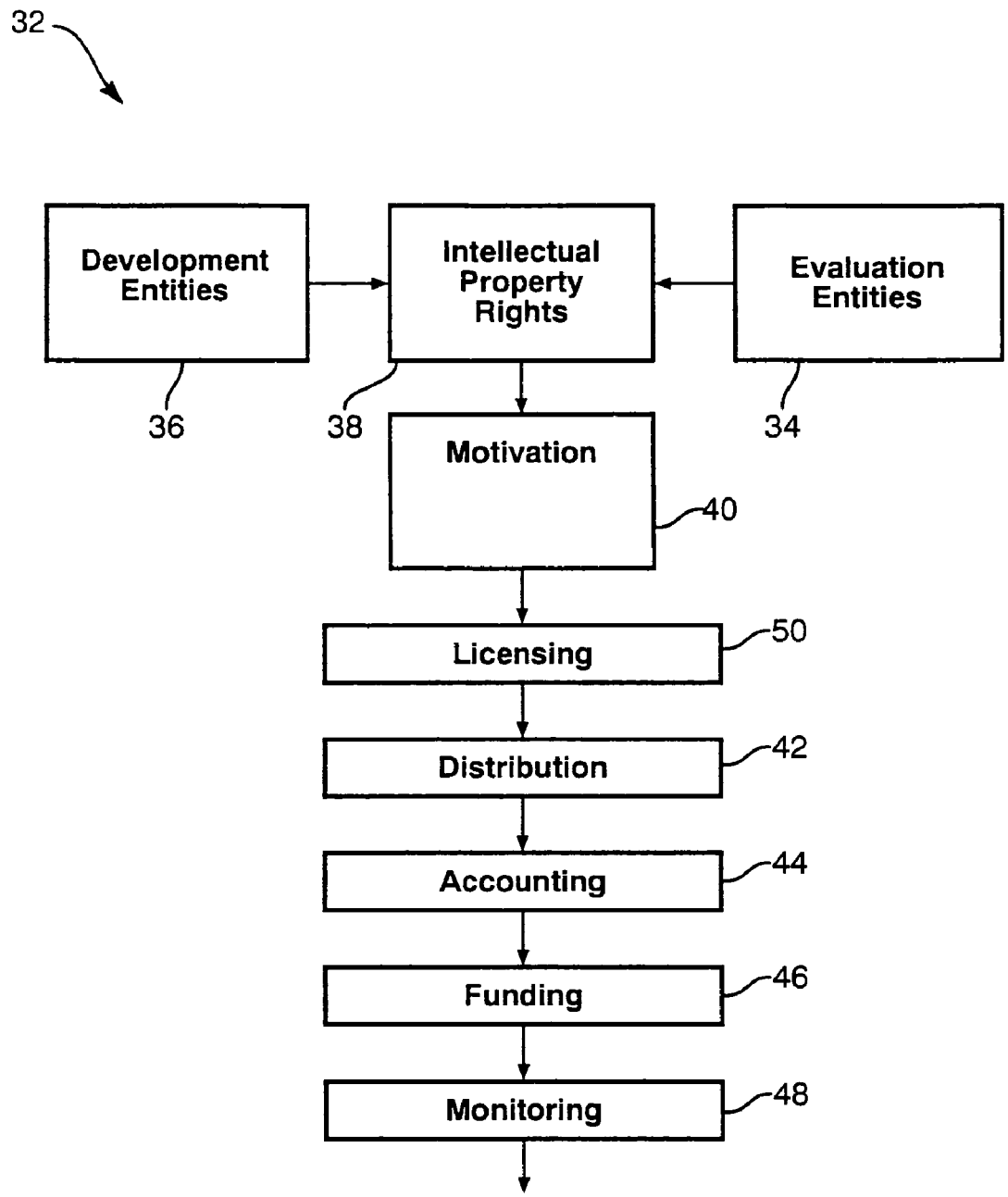
FIG. 2 is schematic block diagram of an alternative embodiment of a process in accordance with the invention.
Figure 2B:
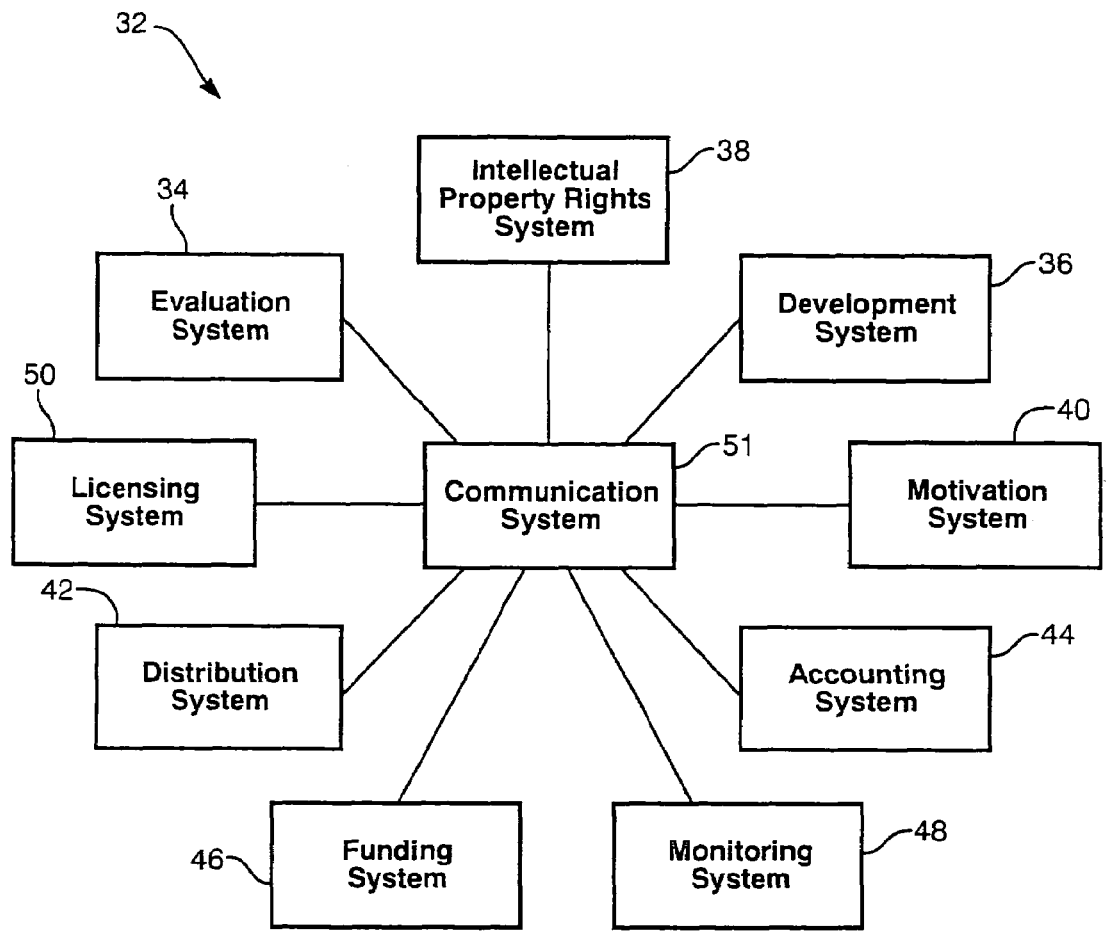

Referring to FIG. 2, embodied in two architectures as FIG. 2A and FIG. 2B, the relationship between entities or systems may be thought of in a variety of ways. To a certain extent, sequential relationships may apply. Nevertheless, in an ongoing process, involving multiple defects, multiple products, multiple companies, or the like, more of a free-form continuing communication architecture may exist.

Referring to FIG. 2A, an evaluation entity 34 may involve a private party, such as an independent third-party tester or developer. Alternatively, an evaluation entity may be a public entity. Possible organizations or entities that may serve as evaluation entities 34 may include organizations such as the Underwriters Laboratory, or an organization responsible for consumer reports and similar publications. The Consumer Product Safety Commission of the United States government, or similar agencies of state governments may serve as evaluation entities 34. Public interest research groups may be evaluation entities, as may any private company, or foundation, or so forth. Ultimately, evaluation entities 34 may identify problems, and may participate in some aspect of an evaluation process 12. Identifying a problem or defect in a product may be a part of an ongoing process and may be aimed at recall, recommendations, or any other purpose. In one embodiment of a process in accordance with the invention, the evaluation step 12, regardless of its motivation, may result in knowledge becoming available regarding defects in products.

Development entities 36 may or may not be associated with the evaluation entities 34. Development entities 36 may be manufacturers in a conventional sense who try to improve their own products in response to evaluation processes 12 conducted by evaluation entities 34 within the manufacturing and distribution chain, or from outside. However, the development entities 36 may just as well be independent third-party developers who are more skilled, or more motivated, and free from the daily routine pressures of those in the manufacturing and supply chain associated with the product.

Accordingly, the development entities 36 may develop their own methodologies for solving problems in a more elegant manner. For example, an evaluation entity 34 may recommend recall of a product. By contrast the development entity 36 may provide a solution that allows for correction of a problem with a product, without recall.

Or, at a minimum, the development entity 36 may provide a solution which can be distributed in association with a recall, greatly reducing the cost of actual recall from acquiring service by manufacturers or suppliers to simply distributing to registered owners a solution package. By either entity 34, 36, intellectual property rights may develop from either testing regimen, solution techniques, production alteration, solution application, or the like. Thus, intellectual property rights 38 may be developed and captured through appropriate registrations, applications, and the like.

In general, some mechanism, including at least motivation 40 by way of information, and possibly including one or more of the steps from the process 10 in FIG. 1, may lead to a licensing entity 50. A motivation entity 40 may often be the development entity 36. Meanwhile, the distribution system 42 or distribution entity 42 may be the parties in the manufacturing and supply chain, or the development entities 36, or even simply the evaluation entities 34, such as any case where information alone is sufficient to be distributed.

Accordingly, licensing entities 50 may involve those giving licenses, those receiving licenses, and those providing the licenses or creating the licenses and negotiating them. Similarly, the distribution entities 42 or distribution system 42 may comprise many different entities involved in having either information, testing applications, solution applications, hardware fixes, and the like distributed to users and owners of defective products.

Accounting systems and entities 44 may provide for tracking of distribution in order to provide funding by way of royalty collection 26, and the like. Similarly, monitoring 48 of compliance of responsible entities with the licensing 24 and with the correction of defects accordance with solutions and testing, may be provided. Again monitoring entities or systems may involve one or more entities from the entities within the manufacturing and supply chain, to the entities within the evaluation establishment 34, to the development entities 36 who stand to gain by proper accounting and collection of royalties. Thus, funding systems 46 may involve processes and entities from multiple locations in order to execute them completely.

Referring to FIG. 2B, the processes 32 or entities 32 may be thought of as systems 32. Systems 32 may involve entities, processes, information, applications, and the like configured to accomplish the task. Accordingly, the communications system 51 may be of any type required in order to provide effective communication between an evaluation system 34, development system 36, an intellectual property rights system 38, and a motivation system 40.

Similarly, a distribution system 42 may include various entities, computer systems, information systems, and a communication system 51 as well as internal communications with respect to the distribution system 42. The distribution system 42 may provide distribution of information and solutions, or information and testing applications, and the like. An accounting system made up of entities and relationships, together with their processes and communication hardware and software may provide the accounting system 44. A funding system 46 may operate by any suitable method to provide effective funding of evaluation processes 12, development processes 14, and the like.

Monitoring system 48 may involve various entities, whether evaluation entities 34, or other entities. For example, the various entities may have those having access to licensing information from the licensing entities 50, accounting information from accounting entities 44, and may be related to funding entities 46 or systems 46 associated with the funding processes.

Figure 3:
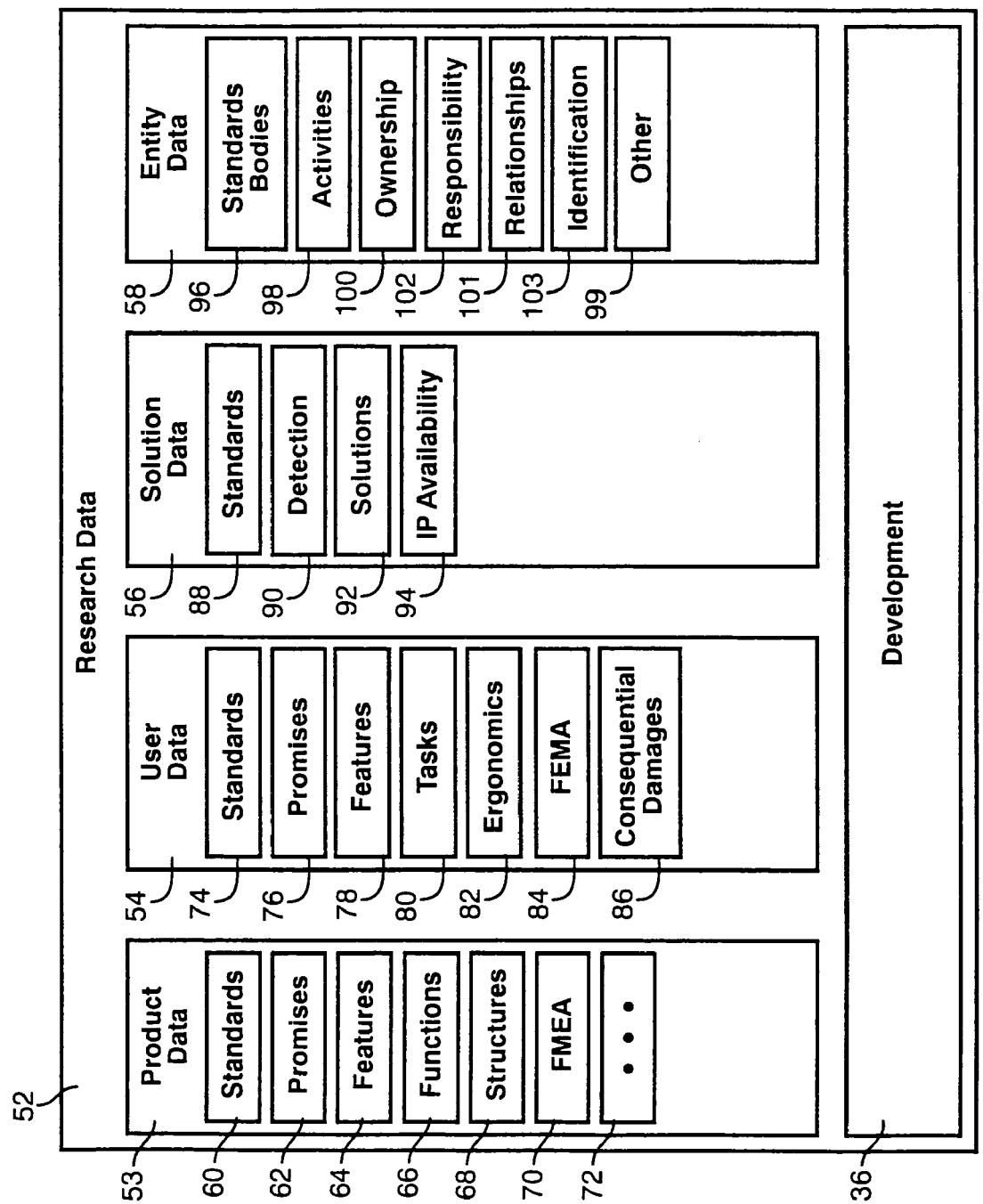
FIG. 3 is schematic block diagram of data structures suitable for implementing an apparatus and process in accordance with the invention.

Referring to FIG. 3, any of the processes of evaluation 12, development 14, intellectual property ownership 16, licensing processes 24, motivation steps 22, and the like may benefit from research data. That is, technical information regarding products, technologies, business, distribution, and the like may be important or required.

In general, a development system 36 may include entities, information, computer programs, databases, and the like. The resulting inputs and outputs from development entities 36 or development systems 36, as well as the inputs and outputs from evaluation entities or systems 34 may be provided as inputs or outputs with respect to evaluation processes 12 and development 14 of solutions. The result of such information, or perhaps a requirement, may be databases or a database of research data 52. In general, research data 52 may include product data 53, user data 54, solution data 56, and entity data 58.

For example, product data 53 may include standards 60 governing a product in question. Similarly, advertising, contracts, and the like may give rise to promises 62 that become imputed or explicit obligations upon sellers, distributors, manufacturers, and developers associated with a subject product. In general, the product data 53 may be regarded as technical data. Nevertheless, promises 62 may be thought of as legal information regarding liabilities or obligations undertaken by entities within the distribution process of the subject product.

Similarly, product data 53 may include various features 64. The features 64 may be advertised features, required features, legally regulated features, or the like. However, the features 64 may typically be those features that are regarded as having commercial value giving rise to expectations and obligations.

Likewise, functionality 66 may be thought of as performance requirements. Features 64 may or may not relate to technical performance, whereas functions 66 will typically relate directly to the principal reason for the existence of a product. Accordingly, the functionality associated with function 66 to which a product is supposedly suited, may be critical.

Likewise, structures 68 may involve mechanical structures, data structures whether executable code or operational data stored by, as a result of or in the process of operation of a subject project, and may be documented by manufacturers, users, and the like. Accordingly, the structures 68 corresponding to a product may be thought of as those intentionally structured elements corresponding to a product, which are responsible for providing the functions 66, the features 64, or both, associated with a product.

Data concerning failure modes and effects analyses 70 may be important. One of the functions of an evaluation process 12 is the determination of various modes of failure, and the effects thereof. Typically, failure modes and effects analysis 70 is thought of as an engineering and functional issue. Nevertheless, in the broader context of businesses and legal liability, failure modes and effects analysis 70 may propagate information beyond the strict function of structures, and relate to the consequential damages or probable effects flowing to businesses as a result of the failure modes of a product. Additional project data 72 may exist as appropriate to a product and the industry it serves.

User data 54 may likewise include standards 74. Many standards 74 are regulated by governments. Other standards are contracted by virtue of either contracts themselves, or by virtue of standardized practice within an industry. Thus, standards 74 may exist, and can be very important with respect to the evaluation processes 12. Similarly, promises 76 understood by users may be significant user data 54. Likewise, promises 76 may not be generic and associated strictly with the product, but may rather be associated with a particular user. As product costs increase, and sophistication of users increases, promises 76 may be more narrowly associated with a user, as user data 54, than with a product, as product data.

Likewise, features 78 may be unique to a user, since much of commercial software, hardware, equipment, and the like is customized with features for a particular application, meaning a particular use by a particular purchaser. Likewise, tasks 80 may be associated with a user and relate a user to a product.

Ergonomic considerations 82 may again be related to the tasks 80, but will typically be a relational data source relating a user corresponding to the user data 54, to a product, corresponding to the product data 53. Again, failure modes and effects analysis 84 associated with users in general, and a specific user, may exist as user.

For example, failure modes and effects analysis 70 of a product may relate to failure of other additional equipment. Failure modes and effects analysis 84 may relate to the consequential damages or effects on a user. Accordingly, damages 86 may actually be a measure of physical or financial damages, related to a user 54, as opposed to a product orientation, as with product data 53.

Solution data 56 may include appropriate standards 88, detection methods, processes, and equipment, collectively referred to as detection data 90, and the like. That is, in general, detection data 90 may be modest or extensive. However, detection data 90 may be critical to the process of effectively identifying and curing defects across a general population of users of equipment found defective, or software applications found defective.

Likewise, solution data 92 may include any information related to provision of a solution. Typically, the solution data 92 will be used by, and provided by a development process 14 associated with development entities 36. Accordingly, solution data 92 may be inputs or outputs to the development process 14 or development entities 36 seeking to solve a problem and provide a solution thereto.

Solution data 56 may include intellectual property information 94, particularly relating to the existence, nature, and availability of intellectual property protection for any of the processes and apparatus associated with solution data 92, and the like.

Entity data 58 may include information relating to various entities. For example, standards bodies abound and regulate much of engineering, commerce, consumer relations, and the like. Accordingly, the data 96 of standards bodies may be significant. The standards bodies data 96 may include information on the entities, as well as information on the responsibilities. Likewise, the standards bodies data 96 may lead directly to provision of the standards data 60, 74, 88 associated with either product data 53, user data 54, solution data 56, or any combination thereof.

Similarly, activities data 98 associated with entities 58 may relate to official activities, unofficial activities, commercial activities, regulatory activities, and the like.

Accordingly, activities data 98 may relate to responsibilities, undertakings, interests, willingness to engage in support or regulation, willingness to provide useful information, willingness to implement remedies, and the like. Similarly, ownership data 100 may be significant, even critical, to identification both of users and owners of defective products, as well as the responsibility chain or liability relationships of various entities in the manufacturing, distribution, and marketing processes related to defective products.

Accordingly, ownership data 100 may be extremely important to an overall resolution of product defects by independent third parties operating as development entities 36. Thus, responsibility information 102 may actually relate to both ownership data 100 and to legal theories of responsibility, liability, and the like imposed by means of regulation, statute, contract, and the like. Thus, responsibility data 102 may provide linkages to various entities associated with various aspects of providing and operating products. Responsibility data 102 may extend to ownership data 100 associated, not only with ownership of factories and plants providing products, but with factories and plants using products after notification of defects. Similarly, relationship data 101 may include legal, commercial, engineering, analytical, and other relationships by which entities may interact. Likewise, identification data 103 may be standard addresses, telephone numbers, other contact information, or relationships that may be hidden. For example, identification data 103 may include identification information relating to entities, relating to products, relating to batches, relating to lots, and the like, as required to link entities with products, link products with products, link products with processes, and so forth establishing the standards bodies data 96 that is appropriate, the ownership data 100 that applies throughout the manufacturing, distribution, and use of defective products, and the responsibility chains 102 that may exist between any entities. Other data 99 deemed useful regarding various entities may also be stored as appropriate.

Figure 4:
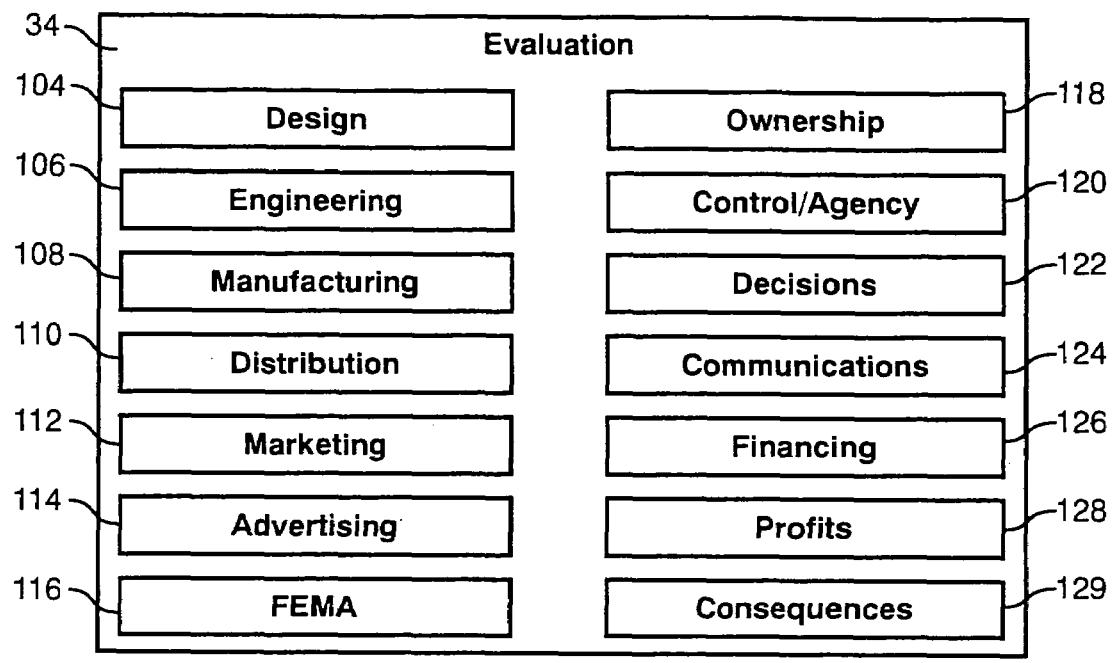
FIG. 4 is a schematic block diagram of additional data structures, particularly adapted to support evaluation in accordance with a method consistent with the invention.

Referring to FIG. 4, an evaluation system 34 or evaluation entity 34 may include numerous subsystems. The subsystems may also be thought of as sub-entities, or sub-functions. Thus, the evaluation system 34 may be thought of as describing either a system of entities and their interactions, the functionalities, the interactions, or all of the above. Thus, in general, an evaluation system 34 may include design 104 corresponding to and responsible for providing product design. Design 104 typically provides aesthetics and ergonomics associated with making a product pleasant, useful, and the like. By contrast, engineering 106 is typically responsible for providing specification and functional analysis. In an evaluation system 34, design 104 may be dedicated to evaluation of design features. Similarly, engineering 106 made to be focused on the engineered aspects of a defective, or suspected defective product.

Similarly, manufacturing 108 may be responsible for evaluation 12 of manufacturing processes and materials in a product. Similarly, distribution 110, marketing 112, and advertising 114, may all be invested in one or more persons, entities, systems, databases, and the like in order to evaluate distribution, marketing, and advertising, respectively, corresponding to a defective product. Often, the major education or communication processes of industry relate to the distribution 110, marketing 112, and advertising 114 entities within a manufacturing or distribution process. In the evaluation entity 34 or evaluation system 34, the entities 110, 112, 114, are responsible for providing the data and evaluation thereof corresponding to these functionalities.

Similarly, a failure modes and effects analysis entity 116 may evaluate, by any suitable means, whether with data or actual products, to properly evaluate 12 a product, or its performance in failure modes anticipated.

From a business point of view, ownership entities 118, control entities 120, and decision entities 122 may also be thought of as entities responsible for evaluating, or as systems responsible for providing evaluation 12 of ownership 118, control and agency 120, and decisions 122 that did or must have occurred within the manufacturing and distribution chain associated with a product.

By the same token, communications 124, financing 126, profits 128, and consequences 129 typically relate to business aspects of distribution and manufacturing of a product.

Accordingly, entities, systems, or processes for evaluation 12 of such information may be assigned to entities or tasks regarded as decision entities 122, communications or systems 124, financing entities or systems 126, profit evaluation systems or entities 128, and consequence evaluation systems or entities 129.

Figure 5:
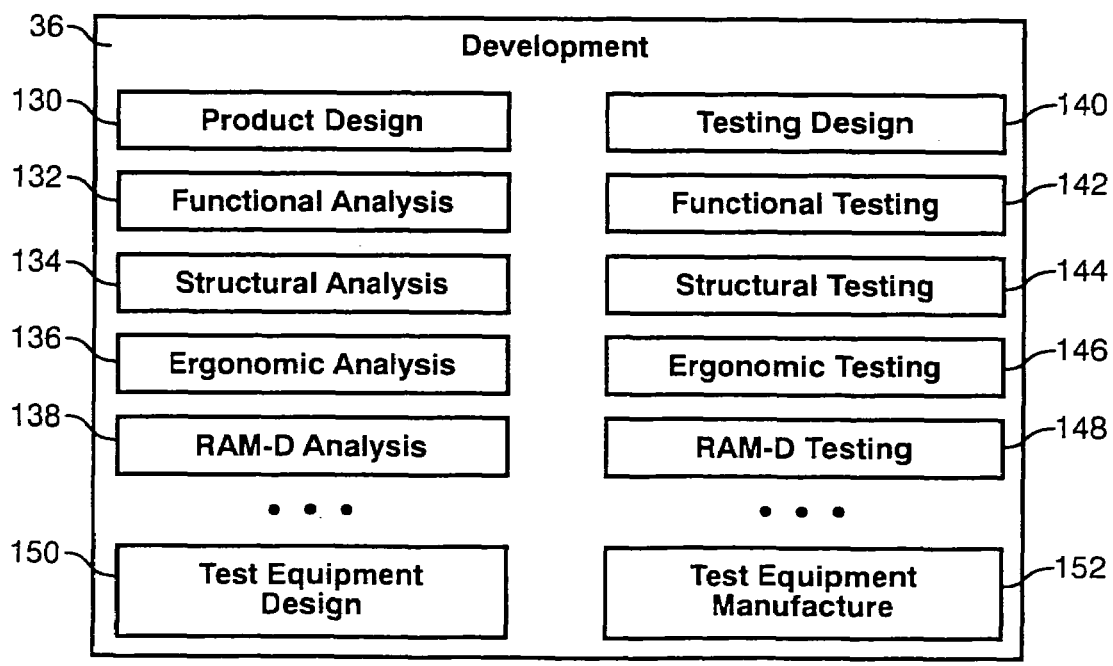
FIG. 5 is a schematic block diagram illustrating processes, which may be executed as software modules, or may represent software modules, in certain embodiments of an apparatus and method in accordance with the invention.

Referring to FIG. 5, a development system 36 or system entity 36 may include entities or systems, as appropriate for accomplishing various tasks, such as collection and evaluation of information, providing analyses, providing new product design specifications or modification methods, and so forth. In general, a development system 36 will provide the functions for a new or modified product that a manufacturer, original developer, or other associated with the product would have provided in the beginning. The same functions must be performed for a modified product or a modification to a product. Similarly, an independent solution, a product in itself, must reasonably undergo the development process to assure that it indeed meets its functional requirements and needs, as dictated by the flaws being corrected in a subject product.

A product design system 130 may focus on the design aspects, including graphics, pleasantness, and general functionality that may not be as technically oriented, but nevertheless provides an operational and pleasing product. Similarly, functional analysis systems 132 provide the analytical support for the proof of concept and operation of an improvement process or product. Structural analysis 134 may involve a mechanical analysis of a mechanical system or a software testing analysis of the integrity of data structures and their relationships within a software product (e.g. application, module, etc.). An ergonomic analysis system 136 provides the information required to assure that users can interact with a product suitably. For example, the ability of a user to read, distinguish, understand, interpret, and the like various icons, statements, text, labels, buttons, and the like on a computer screen may be extremely important. Interacting with mechanical or computer systems may greatly influence their utility.

Reliability, availability, maintainability, and durability analysis systems 138 may be implemented to assure that in time, between failures, the net downtime compared to the uptime, the total amount of service that a product requires, and the lifetime of a product are suitable.

In order to provide testing, tests must be designed. Therefore, a testing design system 140 may be implemented by persons, machines, programs, or the like in order to provide testing design that will prove a product improvement, product modification, or solution product as a reliable option. Similarly, functional testing systems 142 will actually implement tests as designed in order to assure that the functional features or functional operation of a solution product or product improvement operate correctly.

Likewise, structural testing systems 144 and ergonomics testing systems 146 may execute tests as designed in order to assure that the structural integrity, whether mechanically structurally or logically structurally evaluated, meet product requirements. Similarly, RAM-D testing systems 148 may assure the reliability, availability, maintainability, and durability of a product in accordance with expectations of meantime between failure, net fraction of up time or operational time compared to downtime, the total cost and effort associated with maintenance, and the overall lifetime of the product are suitable.

In certain embodiments of an apparatus and method in accordance with the invention, test equipment design systems 150 may be required in order to implement tests. Hardware and software must be designed in order to provide test conditions to meet testing design criteria. Likewise, test equipment manufacturer systems 152 may include people, machines, processes, and the like as needed to provide test equipment effective to conduct tests. Thus, test equipment may be manufactured in accordance with test equipment designs, in order to meet the conditions required to be imposed on a product during a test as designed.

Figure 6:
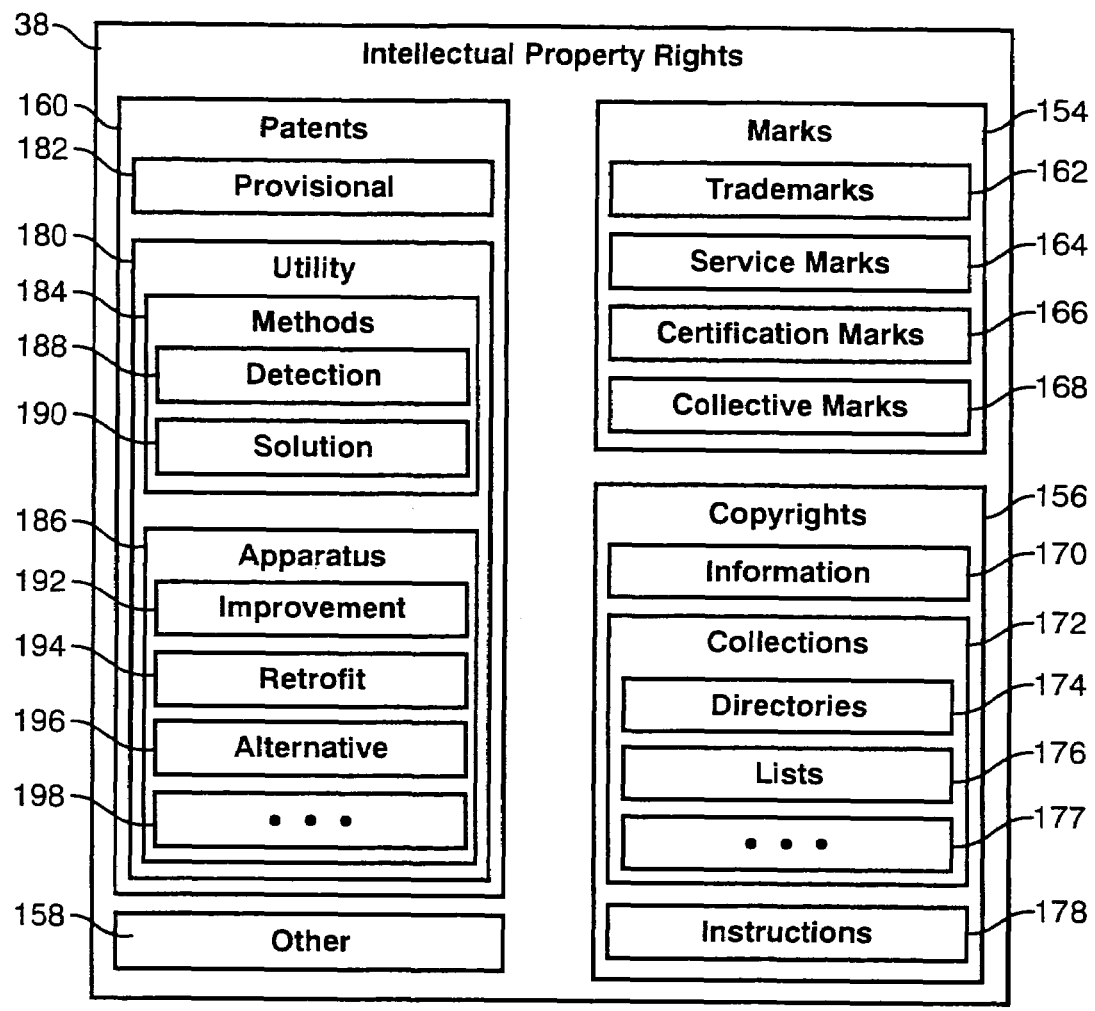
FIG. 6 is a schematic block diagram of processes required for securing rights in testing and solution processes in accordance with the invention.

Referring to FIG. 6, intellectual property rights systems 38 may include people, processes, equipment, information, programs, computers, and the like as necessary to secure intellectual property rights. Accordingly, mark systems 154 for securing trademarks, service marks, and the like may be implemented. Copyright systems 165 may be implemented and relied upon. Other systems 158 may be relied upon, including contracts, secrecy (e.g. trade secret protection), confidentiality, hiring, contracting, and the like in order to protect other intellectual property by other mechanisms. Also, patent systems 160 may be in place to regularly or systematically identify and harvest patentable inventions.

Various of types of marks 154 may include trademarks 162 or systems 162 for securing trademarks. In general, the illustration of FIG. 6 identifies certain intellectual property rights 38, and also fills the need of identifying intellectual property rights systems 38 effective for securing and enforcing those intellectual property rights 38. Thus, marks 154 and systems 154 for marks may include trademarks 162, service marks 164, certification marks 166, collective marks 168, and the like, as provided for in law.

Similarly, copyrights 156 and systems 156 configured to secure and enforce copyrights may be directed to information 170, collections 172, including directories 174, and lists 176, and so forth 177, as well as various sources of information such as instructions 178. For example, instructions 178 and systems 178 for capturing instructions may include software, instructions for modifying software, machine level instructions, software code for instructing a processor and a computer, and the like.

Patents 160, and systems 160 for securing patents may include provisional patent applications 182, and utility patent applications 180. Utility applications 180, or utility patents 180 may include patents directed to methods 184, whether detection methods 188 or solution methods 190, related to a subject product having a flaw to be detected and solved. Similarly, utility patents 180 may include apparatus, typically in hardware or software, which may include improvement patents 192, retrofit systems 194, alternative systems 196, or other combinations, improvements, and the like 198. Intellectual property 158 may include trade secrets or other intellectual property having value, and protected by some other mechanism. Typically, protections may be available by secrecy, contract, and the like, rather than by statutory registrations.

Figure 7:
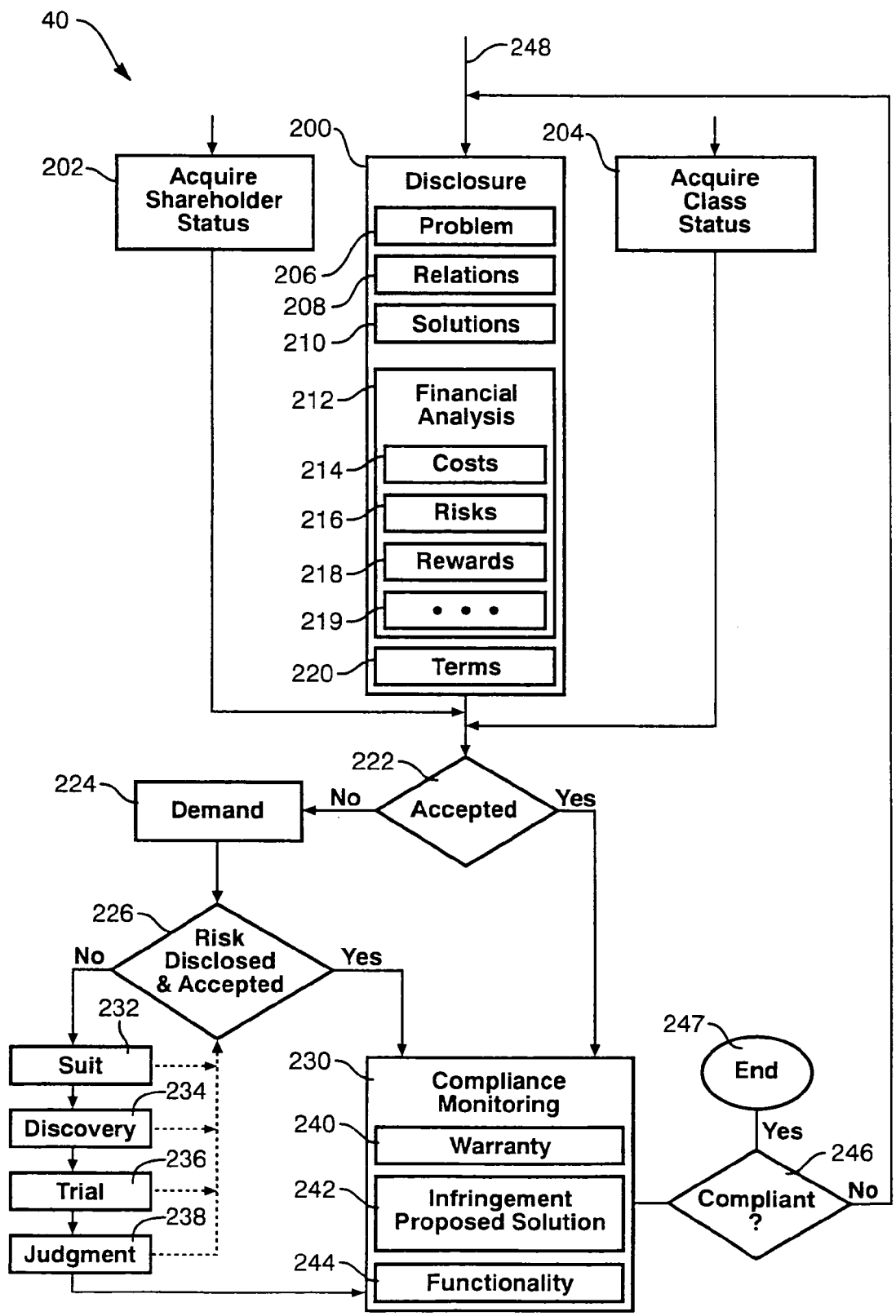
FIG. 7 is an alternative embodiment of a process in accordance with the invention for developing product design solutions and motivating the implementation thereof.

Referring to FIG. 7, a process 40 suitable for motivating a reluctant vendor or manufacturer of a defective product from implementing an improvement product or an improved product may be useful. In one embodiment, a motivational process 40 may include a disclosure 200 disclosing certain problems to a manufacturer or supplier. Thus, a provider of a defective product upon receiving disclosure 200 may be informed of information identifying or describing a problem 206. Likewise, relational information 208 may be provided in the disclosure 200. That is, identifying the relationship between a product, a problem, a liability, and a provider of the product may be important.

Accordingly, relations information 208 may be important as part of a complete and effective disclosure 200. Similarly, disclosure of solutions 210 may be critical to the understanding and the assurance of a potentially liable provider, thus assuring a limitation to liability and continuation of the problem. The presence of a solution 210 may be important to motivation to acknowledge a problem.

Additional information that may be provided in a disclosure 200 may be financial analysis 212. For example, costs 214 whether relating to products, or improvements, damages, solutions, testing, or the like may all be important in the motivation of a provider of a product. Similarly, identification of risk information 216 and reward information 218. For example, proper presentation of corrections may actually be a profitable enterprise for a responsible provider. By the same token, risks 216 and rewards 218 may be shared by various entities including providers of a product, evaluation entities 34, and development entities 36 responsible for providing either testing, solutions, or both.

Other information 219 may be provided as appropriate. In particular, certain terms 220 may be provided as a motivation. That is, measuring risks 216, rewards 218, profits, losses, liabilities, and the like, in terms 220 under which a solution may be obtained (e.g. detection, correction, or both) may be a motivating factor toward acknowledgment and correction of problems.

Before, after, or concurrently with a disclosure 200, an acquisition step 202 may acquire shareholder status for a developer or other entity giving a particular required status in a company. Similarly, an acquisition step 204 to acquire class status may be used. In fact, both acquisition processes 202, 204 may be used. A shareholder status acquisition 202 provides some small degree of ability to influence from inside. Meanwhile, acquisition 204 of class status as a customer, or other user, or damaged party using a defective product may provide a cause of action against a company that refuses to take responsibility for faulty products.

If the disclosure 200, and ultimately the provided terms 220, are accepted by a company responsible for a defective product, then a test 222 proceeds forward affirmatively toward compliance monitoring 230. Otherwise, if the test 222 results in non-acceptance of the disclosure 200, terms 220, subsequent licensing, or the like, then a demand 224 may be lodged. Demanding 224 a settlement or acceptance of a settlement offer may result in an obligation on a company to disclose and accept the risk that the knowledge imparted by the disclosure 200 puts into the company at risk. If the risk is disclosed and accepted, then a test 226 moves toward compliance monitoring 230, with respect to the disclosure 200.

On the other hand, instance of an unmotivated company that does not agree with the assessment of its liability may choose to stonewall against the disclosure 200, or even threaten, resulting in a suit 232. The suit may also imply an additional responsibility on a company to identify the fact that it is involved in litigation over the issue at hand. Again, if the risks have not been disclosed and accepted by the company, then additional causes of action exist in the suit 232 against the non-disclosing company.

In each case, if the test 226 results in proper acknowledgment to shareholders of the risks and existence associated with the outstanding liability, compliance monitoring 230 may be appropriate. In each case, however, to the extent that a risk is not disclosed and accepted, fully informing shareholders, then a suit 232 may be followed by discovery 234 followed by trial 236, and ultimately a judgment 238.

In any event, the progress, if not adequately reported, may add to additional risk, which must be reported and disclosed, returning repeatedly to the test 226. A judgment 238 results in compliance monitoring 230 with respect to the judgment. Compliance monitoring 230 may include monitoring of warranties by a company with respect to its performance in dealing with the information from the disclosure 200, or with respect to any aspect of the legal actions 232-238.

Meanwhile, issues of infringement 242 may be monitored, since alternative solutions proposed by a company, and outside those developed by an independent development entity 36 may actually fail, resulting in a temptation to use an infringing solution. Meanwhile, functionality 244 of any proposed solution may actually be in question. That is, a development entity 36 may provide a solution, and a company responsible for the product may develop an alternative. Nevertheless, if the alternative is not fully adequate, then it is not a true alternative. Thus, functionality monitoring 244 may be apart of compliance monitoring 230 of the activities of a company.

If a company remains compliant, then a test 246 for compliance affirmatively answered maintains stable, or ends in the test 247 and process 40. A negative response to the test 246 for compliance may result in additional disclosures 200 relative to the risks being run by noncompliance, looping through the entire motivation process again.

All of the information discussed with respect to FIGS. 3-6, and the entities and processes associated with the FIGS. 1-7 may be relied upon as appropriate during any and each of the steps of the process 40.

Figure 8:
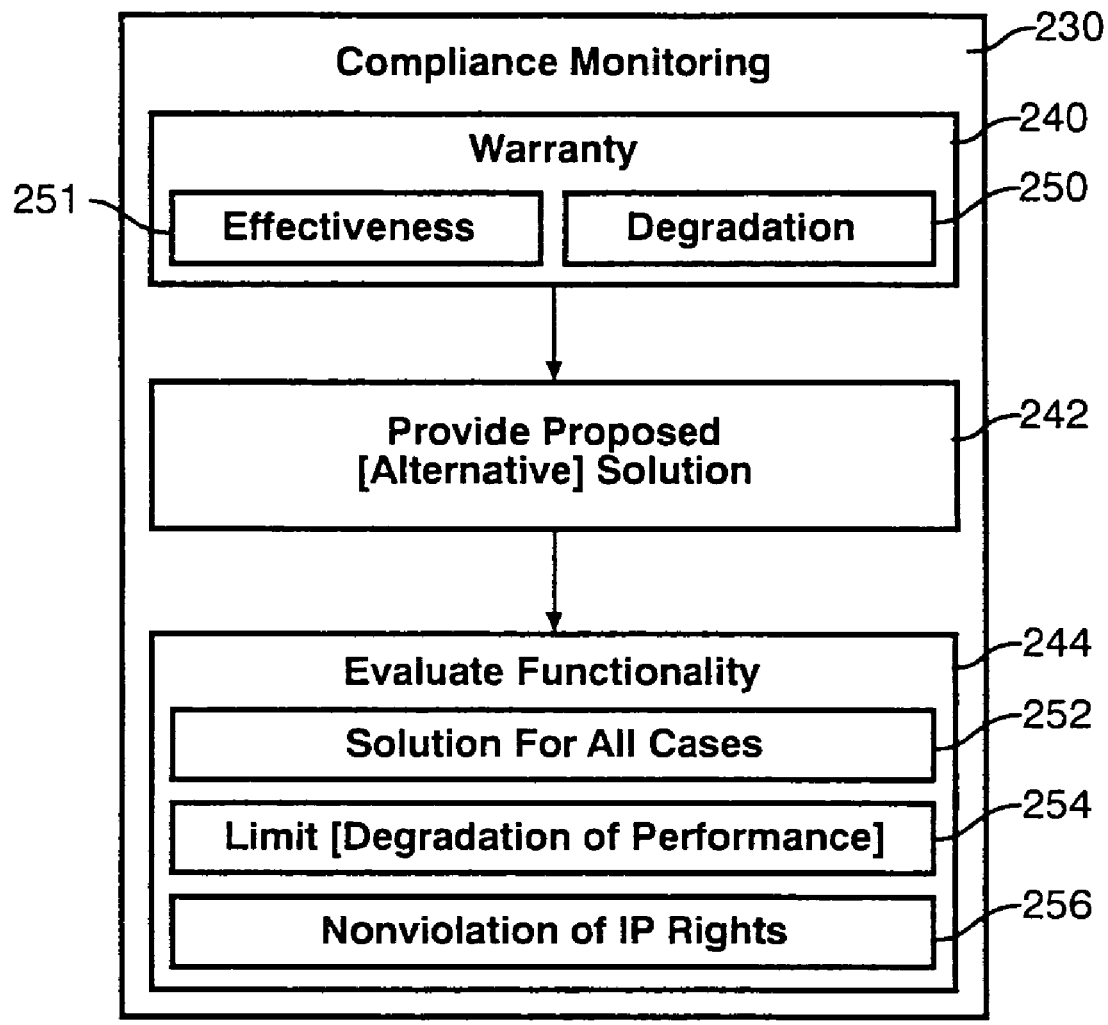
FIG. 8 is a schematic block diagram of an embodiment of a process, which may be embodied as data structures, for monitoring compliance of vendors of defective products corrected in accordance with the invention.

Referring to FIG. 8, one alternative of embodiment of compliance monitoring 230 may include compliance monitoring of warranty provisions 240. That is, a warranty by a provider of a defective product, as a result of negotiation, settlement, or the like, with respect to a motivation process 40, licensing process 24, or the like may be warrantied 240 against degradation 250 of performance, and affirmatively in favor of effectiveness 251 of a product. For example, warranties 240 may be made providing that no degradation of service, operational parameters, or the like will occur. Similarly, the effectiveness to do the functional job may be warranted. Thus, warranty monitoring 240 may involve monitoring 250 of product performance to test for degradation, as well as monitoring 251 of effectiveness to be able to properly operate and perform the function for which the product is intended.

Similarly, a provider of a defective product, or a formerly defective product, may contract, covenant, or be ordered to provide 242 a proposed solution. The proposed solution provided 242 may be that from the developer 36, or may be, optionally, an alternative solution proposed by the product provider itself.

As part of compliance monitoring 230, a proposed solution, subject to the warranty provisions 240, may be evaluated 244. For example, evaluations determining whether the solution fits all cases 252, or a test for all cases 252 may be part of the evaluation 244 functionality. Similarly, evaluation 254 of limits, such as, for example, degradation of performance as one option, may be significant. Similarly, evaluation 256 for non-violation of intellectual property rights may also be apart of evaluation 244 of the functionality of the proposed alternative solution optionally proffered by a supplier of a formerly defective product.

Figure 9:
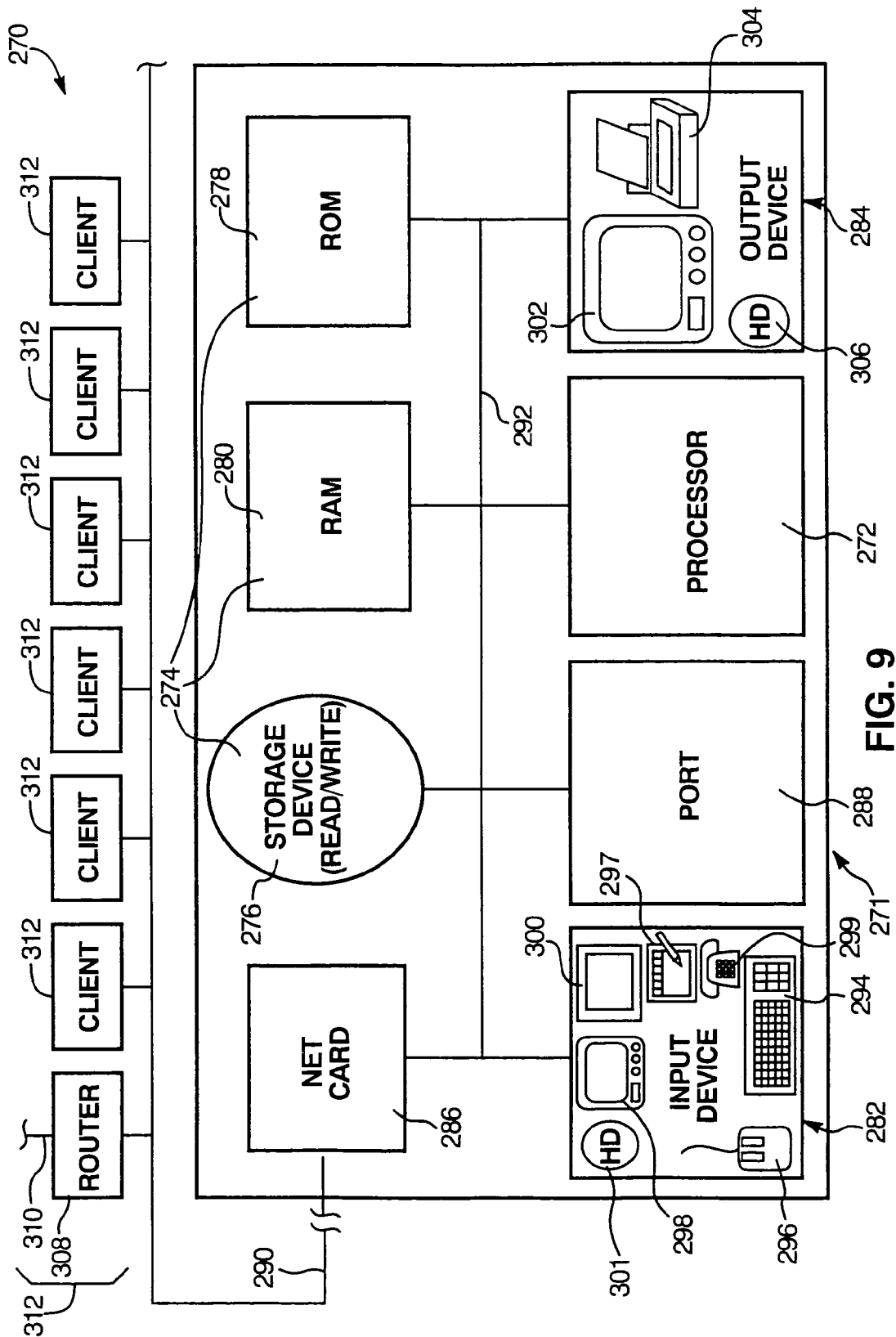
FIG. 9 is a schematic block diagram of one embodiment of a hardware suite suitable for implementing an apparatus and method in accordance with the invention.

Referring to FIG. 9, an apparatus 270 may implement the invention on one or more nodes 271, (client 271, computer 271) containing a processor 272 (CPU 12). All components may exist in a single node 271 or may exist in multiple nodes 271, 312 remote from one another. The CPU 272 may be operably connected to a memory device 274. A memory device 274 may include one or more devices such as a hard drive or other non-volatile storage device 276, a read-only memory 278 (ROM) and a random access (and usually volatile) memory 280 (RAM/operational memory).

The apparatus 270 may include an input device 282 for receiving inputs from a user or another device. Similarly, an output device 284 may be provided within the node 271, or accessible within the apparatus 270. A network card 286 (interface card) or port 288 may be provided for connecting to outside devices, such as the network 290

Internally, a bus 292 may operably interconnect the processor 272 memory devices 274, input devices 282, output devices 284, network card 286 and port 288. The bus 292 may be thought of as a data carrier. As such, the bus 292 may be embodied in numerous configurations. Wire, fiber optic line, wireless electromagnetic communications by visible light, infrared, and radio frequencies may likewise be implemented as appropriate for the bus 292 and the network 290.

Input devices 282 may include one or more physical embodiments. For example, a keyboard 294 may be used for interaction with the user, as may a mouse 296 or stylus pad. A touch screen 298, a telephone 299, or simply a telephone line 299, may be used for communication with other devices, with a user, or the like. Similarly, a scanner 300 may be used to receive graphical inputs which may or may not be translated to other character formats. The hard drive 301 or other memory device 301 may be used as an input device whether resident within the node 271 or some other node 312 (e.g., 312a, 312b, etc.) on the network 290, or from another network 310.

Output devices 284 may likewise include one or more physical hardware units. For example, in general, the port 288 may be used to accept inputs and send outputs from the node 271. Nevertheless, a monitor 302 may provide outputs to a user for feedback during a process, or for assisting two-way communication between the processor 272 and a user. A printer 304 or a hard drive 306 may be used for outputting information as output devices In general, a network 290 to which a node 271 connects may, in turn, be connected through a router 308 to another network 310. In general, two nodes 271, 312 may be on a network 290, adjoining networks 290, 310, or may be separated by multiple routers 308 and multiple networks 310 as individual nodes 271, 312 on an internetwork. The individual nodes 312 (e.g. 271, 312, 314) may have various communication capabilities.

In certain embodiments, a minimum of logical capability may be available in any node 312. Note that any of the individual nodes 271, 312, 314 may be referred to, as may all together, as a node 271 or a node 312. Each may contain a processor 272 with more or less of the other components 14-44.

A network 290 may include one or more servers 314. Servers may be used to manage, store, communicate, transfer, access, update, and the like, any practical number of files, databases, or the like for other nodes 312 on a network 290. Typically, a server 314 may be accessed by all nodes 271, 312 on a network 290. Nevertheless, other special functions, including communications, applications, directory services, and the like, may be implemented by an individual server 314 or multiple servers 314.

In general, a node 271 may need to communicate over a network 290 with a server 314, a router 308, or nodes 312. Similarly, a node 271 may need to communicate over another network (310) in an internetwork connection with some remote node 312. Likewise, individual components 12-46 may need to communicate data with one another. A communication link may exist, in general, between any pair of devices.

Figure 10:
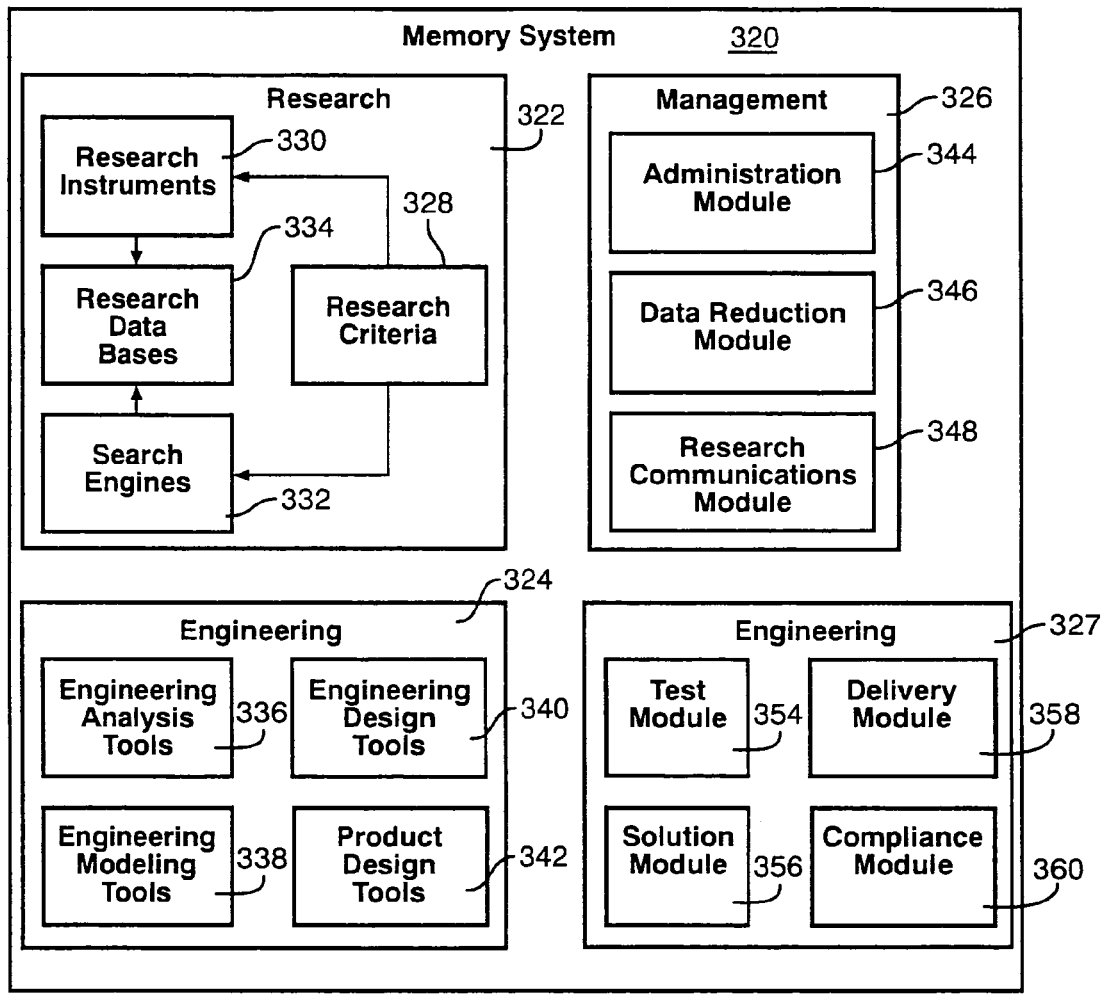
FIG. 10 is a schematic block diagram of one embodiment of a process, which may be embodied as software, firmware, or hardware modules, for implementing research, engineering, administration, and other functions of a process in accordance with the invention.

Referring to FIG. 10, a memory system 320 may include one or more physical entities containing information useable by persons or a computer. In one embodiment, a memory system 320 may include one or more physical memory devices associated with processors or computer-readable otherwise in order to feed information into a processor. Thus, in general, a memory system 320 may store executables and operational data for use by a computer in providing analysis, and outputs having utility in accordance with the invention. In certain embodiments, a memory system 320 may store research information 322. The research processes 320 or research module 320 may include research information, and research executables for supporting or effecting research. Similarly, an engineering module 324, whether physically a single entity or whether only logically related separate entities, may provide engineering.

A management module 326, which may be made up of other modules, logically related, whether or not physically contiguous in any portion of the memory system 320. In general, any module 322, 324, 326, 327 may be embodied as any number of executable instructions at any level of instruction. For example, a single, machine-level instruction, or half a million lines of source code may each serve a role as some type of a module. Similarly, data compositions may be provided as operational data for use in execution by a processor. Such a combination of data may be a module.

A product module 327 may embody the portions of a product improvement process or offering in order to rectify flaws in a previously marketed product. Accordingly, a product module 327 may be made up of separate modules that may be embodied in a computer readable medium in order to be distributed, or to facilitate distribution of product testing, product repair, or other product-related information. The modules making up the product module 327 may be fully executable or fully operable on a computer.

Alternatively, portions of the product module 327 may be exclusively operable on a computer. In other embodiments, portions of the product module 327 may be software elements provided for use by a technician or user in implementing methods in accordance with the invention to correct or improve a product previously sold as a faulty or defective product.

A research module 322 may include research criteria 328. Research criteria 328 may include any information regarded as significant, important, required, or helpful in either making investigations or in operating experiments and tests, or even in simply inquiring of search engines. Accordingly, the research module 322 may include processes and systems for research instruments 330. As with other illustrations herein, the memory system 320 may also be thought of as a model or illustration of systems for providing the information and elements that are identified herein.

For example, research instruments 330 may include hardware, software, or both for conducting tests, controlling tests, or evaluating tests. Similarly, setting up tests, designing tests, or the like may also be included in research instruments 330.

Nevertheless, the research instruments module 330 may also be thought of as one representation of information, software, programming, or the like effective to operate or interact with research instrumentation. Similarly, each block within the memory system 320 illustrated in FIG. 10 may be interpreted as the system for providing information, or as the software, the hardware, the code, or any of the above. Similarly, each module within the memory system 320 may also be considered as the information itself.

Accordingly, the research module 322 may include search engines 332 for searching other data or databases based on research criteria 328. Thus, individual or independent research instruments 330 may provide new information, while the search engines 332 may search for previous obtained information of others. Thus, the research database module 334 may receive information both from the research instruments 330 and the search engines 332, in accordance with the research criteria 328.

Research criteria may include products, product specifications, operations, advertising information, claims, functionality, common uses, and the like. Research instruments 330 may be configured to test or evaluate any fact for its veracity. Research instruments 330 may also be implemented to test a product for performance in accordance with advertised, regulated, standardized, promised, or expected performance factors as identified in research criteria 328.

An engineering module 324 may include engineering analysis tools 336, engineering modeling tools 338, engineering design tools 340, product design tools 342, and the like. In general, engineering analysis tools 336 may be thought of as analytical processes, programs, data, hardware, or any combination thereof that may be effective to evaluate the performance and function of a product in question.

Engineering modeling tools 338 may be used to predict performance of such a product based on measurable or other identifiable parameters. Thus, engineering modeling tools 338 may be thought of as predicting performance. Engineering analysis tools 336 may bethought of as determining whether or not a device performs in a particular way, determining the failure modes and effects, and the like.

Meanwhile, engineering design tools 340 may be thought of as tools relied upon by a developer 36 or development entity 36 in designing a product. Accordingly, information, computer programs, hardware, and the like, may all be apart of the engineering design tool module 340 available in the engineering module 324 as needed to prepare a solution for a defective product or an effective test system for identifying defective products.

Product design tools 342 may sometimes be confused with engineering design tools 340. Nevertheless, product design processes are typically considered to be those associated with the acceptability or usability of a product with respect to a user. Engineering design tools 340 are usually regarded as those associated with strict functionality within some specification, which is typically independent of human users, but may relate to function, strength, electrical parameters, data parameters, and so forth.

A management module 326 may include an administrative module 344 corresponding to administration of the research module 322, the engineering module 324, and possibly the product module 327. In general, administration 344 is a major part of tracking all information, feeding information into an analysis programs, retrieving outputs, and so forth. The management module 326 may include a data reduction module 346 containing analytical processes and systems effective to reduce data to information usable in making decisions.

Similarly, a research communications module 348 may provide the functionality required in order to communicate between various modules 322, 324, 326, 327 or within those modules. For example, information must be retrieved, distributed, analyzed, returned, and so forth in order to control systems, collect information, distribute required information to users thereof, and the like.

A product module 327, as with all the modules 322, 324, 326, 327, may be embodied in any suitable configuration in order to accomplish the logical purpose thereof, regardless of physical location of information or executable commands at any given time. Nevertheless, a product module 327 may include a test module 354, a deliverable provided to or capable of being provided to a user or vendor of a faulty product in order to test such products to determine whether or not a subject flaw exists in the product.

Similarly, a solution module 356 may be optional, and may be distributed to a vendor, user, or others associated therewith in order to provide a solution solving a discovered flaw, discovered as a result of the test module 354 or by other mechanisms. That is, for example, testing and analysis may show that a particular serial number identifies a product having a flaw as a result of being manufactured by a specific process or at a specific location.

Accordingly, a test module 354 may not be required if certain faulty products may be identified readily from some other criteria. Nevertheless, a solution module 356 may typically follow a test module 354 identifying a product as faulty. Accordingly, a solution module 356 may be embodied in computer instructions effective to correct the hardware or software flaw detected in the product.

Similarly, a delivery module 358 may include any or all of those processes, information, and things required to deliver a test module 354, a solution module 356, or both to an appropriate destination. For example, a delivery module 358 may embody any or all, or any subset of all of the required processes, steps, and things required in order to provide information and services to an entity affected by a faulty product.

Typically, a delivery module 358 may be used to inform perspective recipients of the existence, value, and criteria associated with the test module 354. Similarly, the delivery module 358 may embody processes and methods for identifying the significance, requirement, and availability of the solution module 356. Thus, the delivery module 358 may be an engine operating over the Internet to download software for the test modules 354, or solution modules 356 made available with respect to a particular product.

By contrast, the delivery module 358 may be conventional mailings of diskettes to users or purchasers identified with sales of a defective product. Various mechanisms for delivery module 358 may be embodied as required to obtain effective coverage of the distribution of test modules 354, solutions modules 356, or both.

The compliance module 360 may be embodied in several configurations to operate over conventional communication systems, networks, the Internet, on individual computers, or through other information collection systems. In general, a compliance module 360 may provide information calculated to determine compliance of a vendor, supplier, manufacturer, or other entity in the supply chain, responsible for defective products, in order to determine whether or not the correct licensed solution, infringing solution, or an inadequate and faulty solution is being provided.

In certain embodiments, a compliance module 360 may simply be a computer program operating on a computer in a test laboratory to which selected samples of products (e.g. test modules 354, solution modules 356, or both 354, 356) may be sent in order to do a sampled analysis for compliance. Thus, a memory system 320 consolidated on a single memory device, on a diskette, on a computer readable medium of any type, in a computer system, distributed throughout multiple computer systems throughout the world, or in any suitable configuration may provide research 322, engineering 324, management 326, and product 327 effective to identify and remedy faulty products provided from a product supply chain from a manufacturer to users. From the above discussion, it will be appreciated that the present invention provides a method and apparatus for development of solutions to product defects by independent developers as third parties independent from purchasers and sellers of the products. A method and apparatus for improvement of computer-related products by an independent developer may solve problems in hardware or software inadvertently, negligently, or intentionally left in products marketed by a vendor. An independent developer may procure access to a product, develop a testing regimen for functionality of the product, and perform evaluations to identify sources of any operational defects found.

Accordingly, the developer may then provide a generalized testing regimen to test instances of product provided by a vendor, identify those containing the flaw, and may optionally provide a solution to the flaw, where practicable. The independent developer may obtain intellectual property rights in the testing, solution or both for the product. Thus, by notifying a vendor, an independent developer may become a supplier of testing or solution systems, motivating a supplier by one of several mechanisms. The developer may obtain a legal status with respect to the vendor by becoming a customer or user, in order to provide motivation to a recalcitrant vendor not designed to take responsibility for defects known and continued in marketed products.

Figure 11:
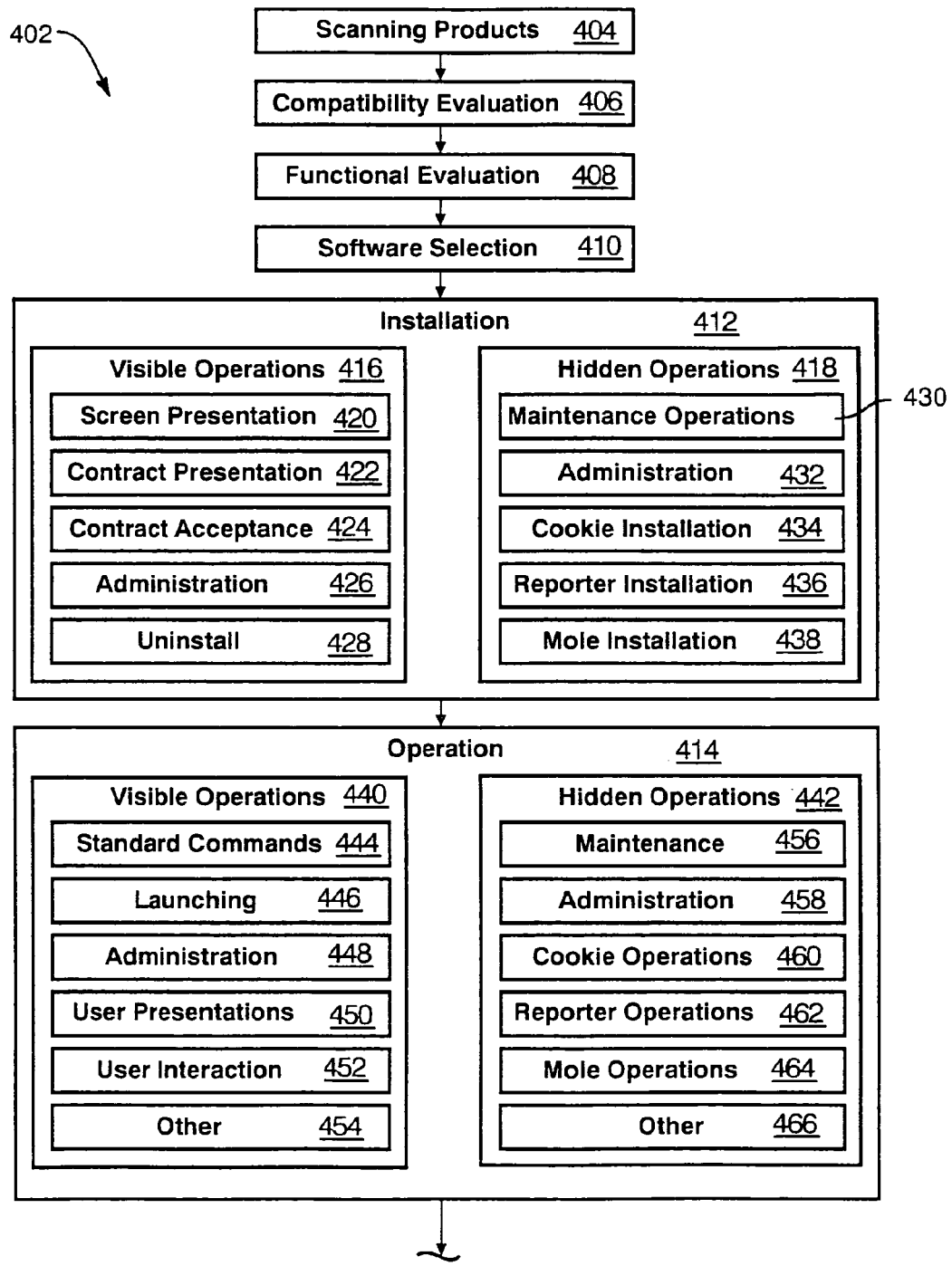
FIG. 11 is a schematic block diagram of a process in accordance with one embodiment of the invention illustrating installation and operation of both visible and hidden operations.

Referring to FIG. 11, a process 402 for installation and operation of software may begin with a scanning 404 of available products. Scanning 404 may include a variety of procedures accumulating information as to the functionality, suitability, and other factors that may relate software to the needs of an individual, institutional, or corporate user responsible for acquiring software. In general, scanning 404 the available products, various literature from advertising, technical specifications, review articles, and the like may be involved in attempting to satisfy a commercial or business need adequately.

An evaluation 406 of the compatibility of software may also be conducted. No software is bought in a vacuum, at least not often. Typically, an individual organization or user may have hardware, software, connected systems, other associated peripheral hardware and software, and the like that will not be uninstalled or obsoleted by the installation and operation of new software. Accordingly, evaluation 406 of the compatibilities and incompatibilities between a proposed software package and the installed base of hardware, software, and the like is typically undertaken.

Another evaluation 408 may address the functionality of a particular piece of software. In some respects, users may actually dispense with the evaluation 408 or functionality, having relied on the information obtained in the scanning process 404 or evaluation 406. Nevertheless, in typical installations, users, particularly the more sophisticated users may test, examine under operating conditions, download, beta test, and the like, particular software by way of evaluating 408 the functionality in practice.

Ultimately, a selection 410 results in a purchase, distribution, downloading, or the like, putting a user or organization in possession of particular software to meet a perceived need. The perception of need may be relevant to an individual user, an organizational manager or administrator, a system's administration, or a consulting organization or individual. That is, the actual selection 410 may be delegated or relegated to one or several individuals or organizations. Thus, the selection 410 of a software package may sometimes occur without the specific awareness of an organization or responsible management entity, inasmuch as many organizations actually rely specifically on the advice of a particular management information system organization or individual, a consulting organization, or the like. Nevertheless, by some means, selection 410 results in software becoming available for installation 412 followed by operation 414.

Installation 412 may include visible operations 416 and hidden operations 418. For example, visible operations may include presentations 420 to the screen of a user. Presentations may take a variety of forms including graphics, text, and the like. Typically, one may expect a presentation 422 of a contract. The presentation 422 is often couched in terms of a license to operate software. The presentation 422 is typically a text representation of a document that, by its terms, is binding upon users and owners of the software selected. A location, dialogue box, input button, or other interactive device may be presented on a screen of a user to extract an acceptance 424 of the terms in the presentation 422 of contract or licensing provisions.

Likewise, visible operations typically include a variety of administration 426 types of tasks required in order to effect the installation process. Many users may think of the administration process 426 as the majority or the desired and significant portion of the installation of software. Nevertheless, from a vendor's point of view, the acceptance 424 may actually be the most important. Moreover, a vendor of software may actually rely on an installer or owner substantially ignoring the presentation 422, and simply executing an acceptance 424 by pressing a button, hitting an enter key, hitting a return key, or the like.

Meanwhile, administration 426 may involve executables that provide substantial interaction with a user installing the software, or may be largely opaque to a user or transparent, although the effect of those terms is often used interchangeably. That is, a user may actually be unaware of what is happening other than the fact that installation is progressing as a number of "continue" buttons are activated to move the installation forward. In other installation processes, a user may actually be required to input various responses to inquiries into configuration data.

Some software may provide an uninstall 428 option. Other software does not include an uninstall 428, and thus may clutter a computer with substantial software library elements long after the software has fallen into disuse. However, responsible software installation 412 provided by a vendor may typically provide some mechanism to uninstall 428 the software.

On the other hand, hidden operations 418 are not so benign, nor are its users so aware of their presence or what they are doing. In general, various background maintenance operations 430 are typically undertaken by an installation module 412 for software or an installation process 412.

That is, the visible operations 416, and hidden operations 418 during installation 412 may be thought of as a set of necessary software modules. On the other hand, each software module and the execution thereof may be incorporated into a step or process. Accordingly, maintenance operations 430 may be embodied in certain software modules 430 for conducting the step 430 of maintaining the necessary files, identifiers, pointers, data writing and reading, register filling, default setting, and the like necessary to support the installation 412 of a software package. Meanwhile, administration 432 may involve much of the administrative work that actually underlies the maintenance of records, paths, identification of locations, addressing, sequencing of logical steps and the like.

However, other hidden operations 418 may include installation 434 of cookies. Cookie installation 434 may involve the installation of data structures, embodied as executables or simply information, that will be read out from an individual's computer to a computer associated with another interested party. For example, a cookie installation 434 may involve a cookie that reports back the model of the computer, the name of a user, and the particular serial number and model number of the software installed. Thereafter, any time a user accesses the internet, the software 434 may actually be responsible to send a cookie back to the software vendor reporting on the status of the computer, software, or the like associated with the user.

Various types of software are created, with more or less invasive behaviors. For the sake of discussion, the installation 436 of reporters, and the installation 438 of moles are identified here simply by way of articulating different levels of intrusiveness or invasiveness associated with software installation 412. For the sake of discussion here, a cookie involves a modest amount of data. Typically that amount would be provided upon user registration of software in a traditional manner such as submission of a return postcard.

Reporter installation 436 is used to refer to more invasive software that provides back to a vendor of software or manufacturer of software, or the like, additional information about the operation, configuration, status, or software installations on a computer. In general, reporter installation 436 involves information that is readily available on a user's computer, and associated with a user's operation of the sold software for which the installation 412 was invoked. The relationship may be somewhat tenuous, but some modicum of connection exists.

By contrast, the installation 438 of a mole is intended to mean the installation of executables that acquire or inquire into additional information that is either more intrusive, or unconnected to the operation of the software in question. Installation 438 of a mole may be thought of as installing software capable of extracting, without the knowledge of a user, information that a user would typically not reasonably believe to be necessary for support of software. It may be information that a reasonable user would not usually want to have available to others, particularly without the affirmative knowledge of that release of information.

That is, the installation 438 of a mole may be thought of as what a reasonable person would consider an invasion of privacy. The reporter installation 436 may involve software capable of downloading information that a typical user does not want to divulge, but which effectively does no harm, cannot be used to do harm, is not embarrassing, and may involve simple collection of information associated with the operation of the software with other parts of a user's computer.

Thus, the distinction between the installations 434, 436, 438 is somewhat arbitrary, but a cookie installation 434 might be thought of as something that a typical user would be willing to provide, a reporter 436 is something that a typical user might reasonably be expected to object to, and a mole installation 438 may typically involve information that a user would seriously object to. Either the information from the reporter or the mole may be significant enough to give rise to a legal cause of action if obtained without truly informed consent of a user.

Likewise, the operation 414 of the software involves both visible operations 440 and hidden operations 442. Typical visible operations may be standard commands 444, including those commands required to interact with the software during operation 414. Likewise, the operation 414 of software, particularly an operating system or the like, may involve launchings 446 of other software packages, libraries, subroutines, and the like. Various administration 448 is typically required in order to maintain file integrity and execute the various tracking of files, process, and other data processing during the logical operation 414 of the software package.

User presentations 450 may include the processes of retrieving and presenting information, as well as any graphical or other support in order to draw a user s attention to a particular item of information. User presentations 450 may include such items as informative screens, output to a screen, output to a hard copy, or the like. Presentations 450 may also include providing electronic outputs to other devices that may be used by a user. For example, an output of a software application or operating system may actually have the functionality of simply feeding or supporting another software application. Thus, user presentations 450 may involve presentation of information to another medium or another device or another software package.

User interaction 452 typically involves various types of interactive buttons, menus, dialogue boxes, and so forth as known in the art for interaction by a user with software. Typically, presentations 450 may be thought of as those systems, devices, methods, and executables reasonable for presenting information to a user, whereas user interaction 452 may be thought of as those mechanisms, systems, devices, applications, executables, and the like that provide information from a user back to a computer and allow interaction therebetween.

Other operations 454 may also be included, since the listing illustrated in FIG. 11 is not exhaustive by any means. Nevertheless, these operations 414 illustrate good examples of the types of operations 414 that may be visible 440 of which a user may be aware.

Hidden operations 442 may likewise include the rather benign maintenance operations 456, administration 458, similar in responsibility to the visible operations 440, and in support thereof. Similarly, however, in the operation 414 of the software, cookie operations 460, reporter operations 462 and mole operations 464 may occur.

That is, corresponding to the installations 434, 436, 438 in which invasive executables are installed, the actual operation 414 of software may include the operation 460 of cookies and the executables for transferring data, fulfilling their informational needs, and sending them back over the internet. Likewise, reporter operations 462 may report back information associated with a computer or a user, and mole operations 464 may obtain more invasive information from the hard drive or processor of an individual user. Other hidden operations 466 may be legitimate or invasive. Meanwhile, however, hidden operations 442, and hidden installations 418 are by their very nature hidden from the typical user. Thus, an unscrupulous vendor may provide a contract presentation 422 that purports to obtain permission from a user to permit obtaining the information that might be reported out by cookie operations 460, reporter operations 462, mole operations 464, or a combination thereof.

In the medical profession, a consent exists called "informed consent". In the computer industry, the concept of informed concept may not be so thoroughly developed. Everyone acknowledges that a lawyer or doctor obtains highly sensitive information from a client. Most people may not be so sensitive to or so aware of the sensitivity of computer information. Fewer will be aware of the many opportunities that a computer connected to the internet may have to execute invasive instructions and send invasive instructions to collect and distribute highly sensitive information about a user or a computer.

Referring to FIG. 12, preparation of a contract presentation 422 may involve various steps assembled in a process 468. For example, a selection 469 of terms and language may include identification of all of the information and obligations that are to be exchanged by parties. Typically, selection 469 of terms and language may be thought of as a requirement in any preparation of an agreement or contract. A license is simply one form of a contract.

Meanwhile, some vendors begin to standardize 470 the format for presentation of the selection 469 of terms and language. For example, the size of the presentation, the content, the choice of language or terminology, the organization, the grammar, and the like may all be standardized 470 in a way that makes a license or contract presentation 422 simple or complicated. Similarly, standardization 470 may render a document long or short. Standardization 470 may render a document likely to be read or unlikely to be read, likely to be understood or unlikely to be understood.

An unscrupulous vendor may standardize 470 a format of a contract presentation 422 in such a way as to maximize the likelihood that a user will not actually read and understand the contract. Thus, a user may actually never read a licensing agreement. Similarly, terminology may be selected so that a user is unlikely to understand all of the terms and language selected 469 for inclusion in the standardization 470 of the format. Moreover, grammatical twists, turns, and formulations may also contribute to confusion.

In certain circumstances, text may exceed 471*a* particular length, such as the length needed to either lull or bore a reader into ceasing reading. Similarly, the standardization 470 of the format of a license may lull a user into security thinking that the license reads like, sounds like, looks like, etc. several other licenses by the vendor or by other vendors. Thus, exceeding 471*a* particular length may likely lull or to bore a user into not finishing the document, or into skipping over key parts thereof. This effect may be accidental or intentional.

Similarly, once a particular contract presentation 422 has been installed over many years, an unobtrusive modification 472 may be effected without great fanfare or notice. For example, a line, a few lines, a slight variation of terms, or the like is much less likely to be noticed then would a major departure, a highlighted section, a section of a contract moved to the beginning of the contract, or a bolded portion of text near a signature block. Accordingly, unobtrusive modification 472 may be effected in a document that appears to be identical to many other documents executed over years, and read at some point in the past.

Once an unobtrusive modification has been determined, as to location, terms, format, and the like, then implementation 474 of those terms may be effected substantially at will. Accordingly, a user who is not extremely careful in reading every word of every license and understanding it, may effectively be duped into executing a contract on terms that are not understood or intended to be agreed upon.

Figure 13:
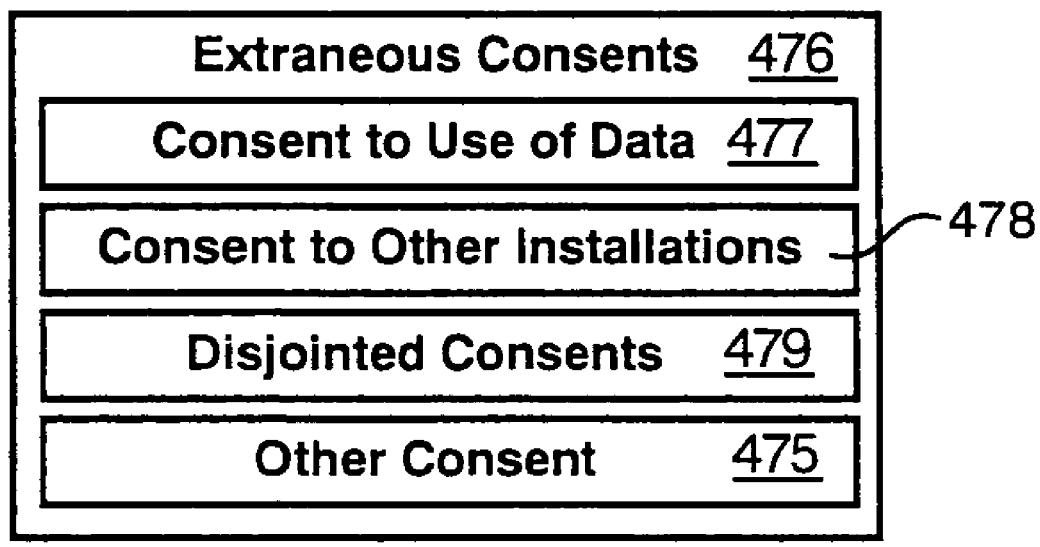
FIG. 13 is a schematic block diagram of various types of consents that may be obtained in licensure.

Referring to FIG. 13, a contract presentation 422 that may be incorporated into a user presentation 450 in order to extract user interaction 452 accepting terms or consenting to terms may be legitimate. On the other hand, imbedded within legitimate terms and terminology may also be various versions of consent 476 or extraneous consents 476 authorizing a software vendor or others to conduct invasive cookie operations 460, reporter operations 462, mole operations 464, or the like 466.

For example, consent 477 to the use of data created by or proprietary to a user may be included in the license agreement. Similarly, other consents 475 may be extracted surreptitiously by a vendor. For example, a vendor may include through an unobtrusive modification 472 a consent 475 for anything that an individual can legally consent to or contract for.

Some have observed that in America one can contract away almost every right except life and liberty. Accordingly, other consents 475 may include consents not to object to certain invasive software installations, or consent to the use of information for various and sundry purposes, and the like.

For example, a consent 478 to other installations of software, over the internet, onto the computer of a user may be imbedded in various contract presentations 422. Similarly, disjointed consents 479 may be imbedded in an unobtrusive modification 472 or in the body of a license agreement in such a way that the totality of rights that have been granted or consented to is unclear to a user.

Thus, rather than using plain language, a vendor may surreptitiously obtain a consent 478 to install software, may obtain in an unrelated location a consent 477 to use of data. A series of disjointed consents 479 that do not appear related to one another may basically obtain an agreement that a user's computer may serve to a remote location information or processing at will.

Some have opined that the only difference between crackers, hackers, and certain reputable vendors of software may be that crackers and hackers do not have a contract presentation 422 in which to obtain the misunderstood extraneous consents 476 that form the basis for invasive software installation and operation.

Figure 14:
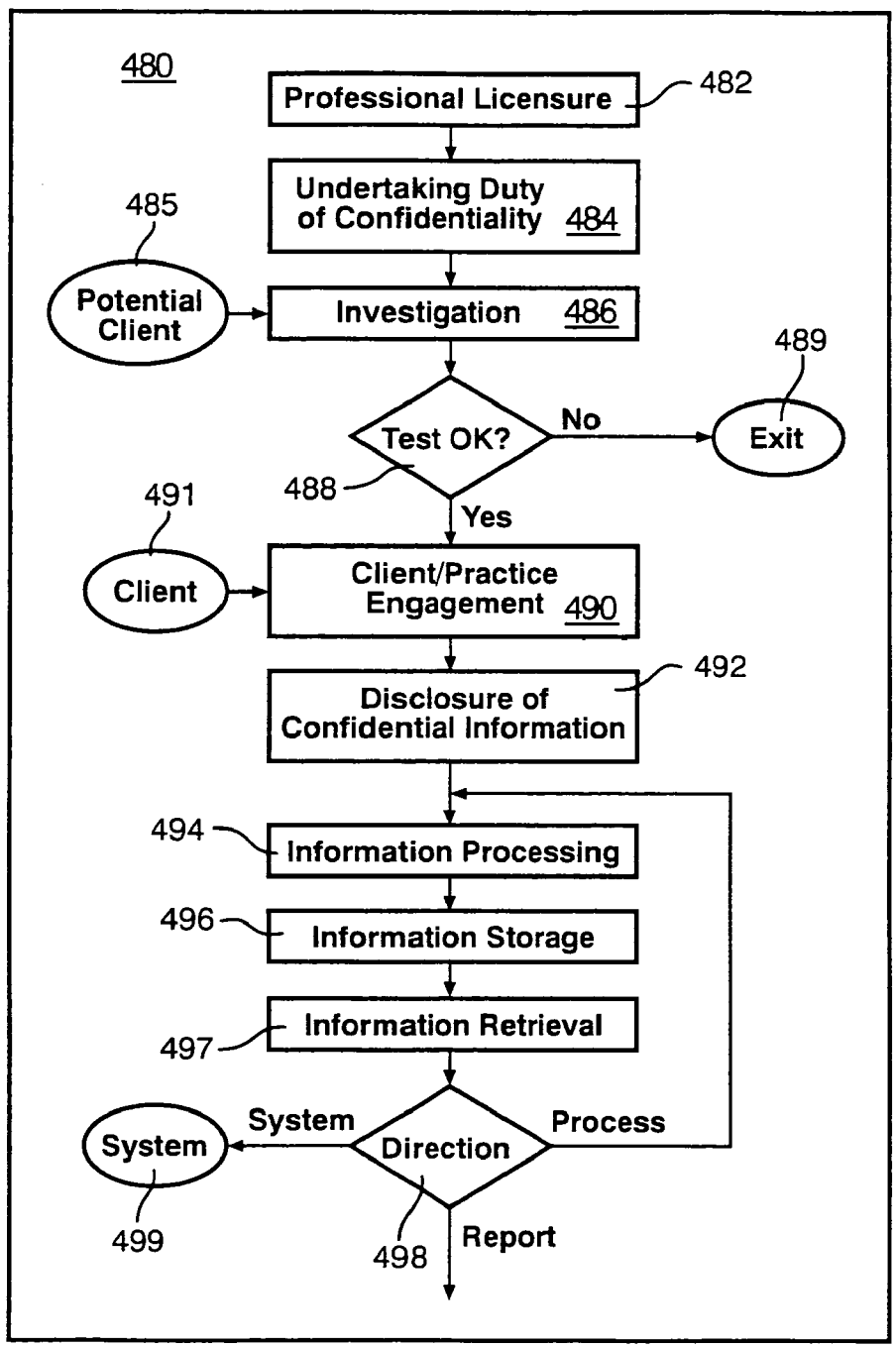
FIG. 14 is a schematic block diagram of a process that combines both professional responsibilities and software operation issues.
Figure 15:
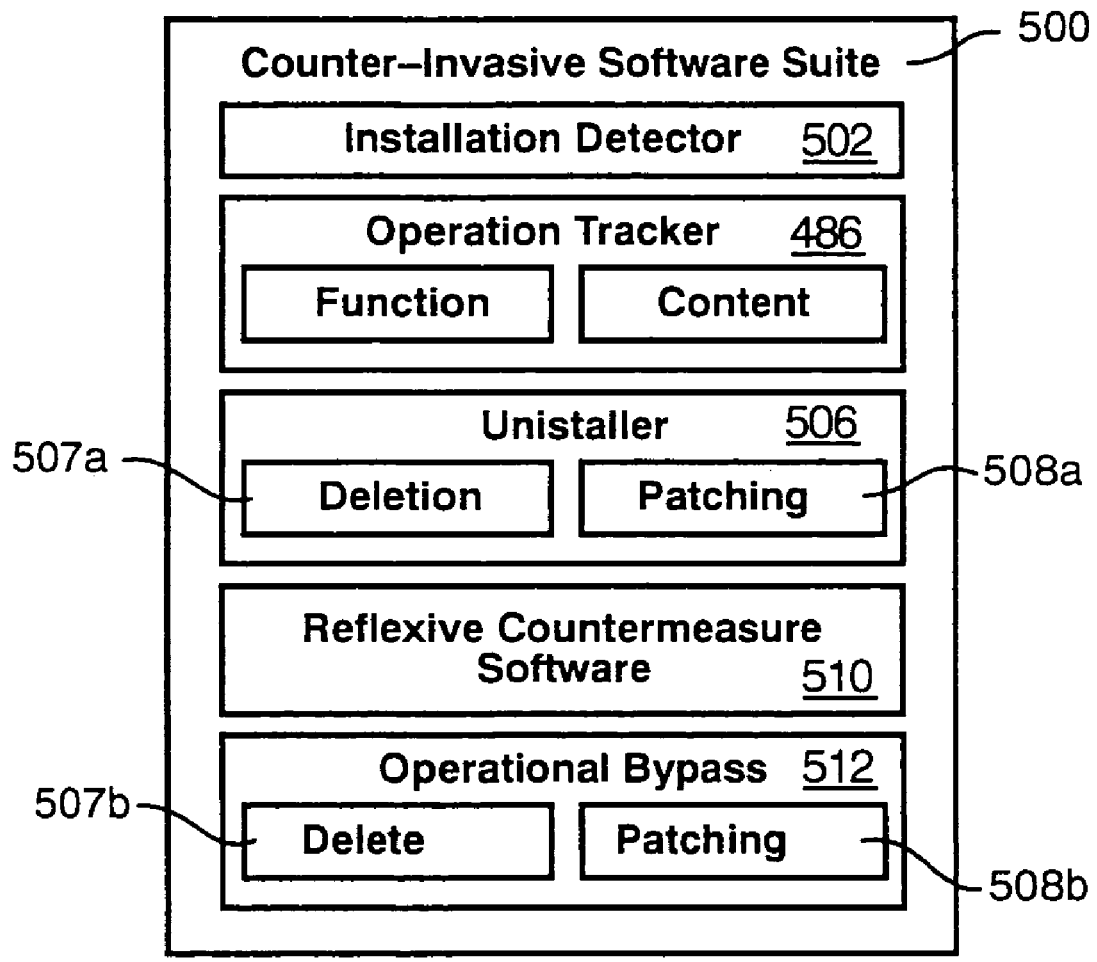
FIG. 15 is a schematic block diagram of a counter-invasive software system in accordance with the invention.

Referring to FIG. 14, a process 480 demonstrates coalescing of potentially fractious duties or circumstances. For example, a professional in the health care industry or the legal industry may be subject to professional licensure 482. Similarly, accountants, such as Certified Public Accountants, engineers, and various others may be subject to professional licensure 482.

Having been subjected to professional licensure 482, and undertaking 484 of a duty of confidentiality is often part and parcel of the requirement or burden of professional licensing 482. Thus, by virtue of the regulatory scheme of a state or a federal government, licensing may bring with it the undertaking 484 of a duty of confidentiality with respect to client information, customer information, or the like.

The undertking 484 is no mean obligation. In the legal industry, for example, the duty of confidentiality is one of the principal obligations of an attorney, is protected by a substantial body of law, and is enforced by various entities, not the least of which is the State Bar organization of each state.

When a potential client 485 approaches a licensed professional or a regulated professional organization to provide services, that organization or service provider may conduct an investigation 486. The investigation 486 may involve checking conflicts that may exist or may potentially exist. An investigation 486 may cover the suitability of the services provided by the professional entity for clients in general, and for a potential client 485 specifically, and the like. An investigation 486 may involve verification of the facts and information provided by a potential client 485, as well as an investigation into the remainder of the practice of the professional entity.

Ultimately, a test 488 may be thought of as the decision process by which a regulated professional individual or organization determines that representation of a potential client 485 or servicing of a potential client 485 is appropriate. If providing services is not appropriate, then the test 488 may result in an exit 489 of the service provider from the relationship or potential relationship with a potential client 485.

However, if the test 488 results in an affirmative decision to represent or service the potential client 485, then an engagement 490 of the client 491 by the professional practice entity converts the potential client 485 into an actual client 491 having a relationship.

In confidential relationships such as those maintained between professionals and their clients 491, disclosure 492 of confidential information is routinely made by clients 491. Processing 494 of information may be manual, mental, computerized, or the like. Necessarily, disclosure 492 of confidential information results in certain of the information processing 494 including confidential information.

Similarly, processing 494 usually entails information storage 496 before and after processing 494. That is, raw information may be stored 496 prior to processing 494. Similarly, subsequent to processing 494, new information may be stored 496 for later retrieval 497 or further processing 494 at will, or as necessary in the future.

In computerized information storage 496, retrieval 497, and even during processing 494, a great deal of administrative labor must be executed by a computer, in order to manage, identify, track, locate, and so forth important information. Accordingly, information retrieval 497 inherently has a purpose, which purpose may be thought of as a delivery of data to destination.

Accordingly, information retrieval 497 may result in direction 498 of information to, for example, additional processing 494. Likewise, information retrieval 497 may involve direction 498 of information to a report. In certain situations, the computer operating system 499 may actually be the destination to which information retrieval 497 may be directed 498. A provider of the system software 499 may program the operating system or other system software in such a way as to control the direction 498 of information retrieved 497. Accordingly, the system 499 may actually become an agent for a third party, directing information retrieval 497 for the ends of an independent third party, such as a software vendor. Once a vendor has determined that it will direct 498 surreptitiously information retrieved 497 from information storage 496, no practical limit may exist on the information. This information may be taken from a client 491 by way of the information storage 496 and consequent retrieval 497 in the office computer of a licensed professional serving the client Referring to FIG. 15, a counter-invasive software system 500 or software suite 500 may provide several modules effective to counter the invasive nature, operation, function, or the like of invasive software. For example, an installation detector 502 may identify installation operations that may be hidden from a user.

Similarly, the detector 502 may identify programs by name that are inappropriate, new, or that have been identified by a programmer as being invasive in nature. The detector 502 may identify a type of file or a type of installation operation that is deemed inappropriate for legitimate software, or that has a high probability associated therewith that it is part of an invasive software package.

Similarly, various lengths and locations of various types of files may indicate that they are in appropriate. A detector 502 may catch software accessing regions of memory or of an operating system that should not be accessed by such an installation. In general, the installation detector 502 has the function of detecting to the extent known by either classification, operation, specific name, or the like, the attempted installation of invasive software or invasive software types. It may also monitor access by software installation programs to generally regarded invasive locations and the like.

Other modules that may be included in counter-invasive software systems 500 may include operation trackers 504. For example, the operation tracker 504 may track both function and content of installed software or operations of installed software. For example, inputs, outputs, operations that appear to be mining information, access times, access durations, destinations of accessed locations, URLs accessed or transferred, e-mail addresses accessed or transferred, file types accessed, file names accessed, and the like may all serve to identify types of information that an operation tracker 504 may find useful. In general, an operation tracker 504 operates to identify behaviors in patterns or operations that might indicate a probability of existence of invasive software.

Another module in a software suite 500 may be an installer 506 that provides for deletion 507a, patching 508a, or a combination thereof in order to uninstall all or part of invasive software. For example, an installer 506 may be able to uninstall specific modules that are invasive, while leaving operable the remainder of an operating system or other software that was installed properly. In order to do so, it may be necessary to delete certain lines of code, and patch others, such as certain pointers, to obviate the need for the deleted coding.

Selective removal, total removal, or disabling software are all options. In addition, software may be spoofed. Software systems that are invasive may also be attacked by the sending back of spurious information, or by actual attacking executables.

Certain reflexive countermeasure software 510 may be available only to governments and agencies sponsored by governments. Nevertheless, at a minimum, reflexive countermeasure software 510 may include symbols imbedded in images, symbols imbedded in text, various signatures or fingerprints that are sent back, cryptic codes, and the like, that may later be identified in databases of invasive software vendors.

Thus, at some future date, after tracking 504 of operations to identify an invasive software vendor, reflexive countermeasure software 510 will have been providing nondescript combinations of characters or codes. These codes are simply data to an invasive computer. They may be identifying signatures identifying the source and impropriety of purloined information to an investigator.

In certain circumstances, reflexive countermeasure software 510 may be operated by governments or under authorization of the government to send reporters, bombs, software, and the like back to the invasive software sources. However, it may typically be expected that invasive software sources treat incoming information strictly as data. However, to the extent that URLs or other addressing information are obtained by invasive software, information may be used that is accessed only by counter-invasive software systems 500. In such an operation, the reflexive countermeasure software 510 may effectively misdirect invasive software systems to obtain information that will mislead and track invasive software to contact destinations (URLs and the like, etc.) uniquely created specifically for the purpose of trapping invasive software vendors.

In other alternative embodiments, operational bypasses 512 may be provided to defeat invasive software. In general, a bypass 512 may simply return any necessary data or coded information in order to make operations appear as if they are successful or in accordance with the planning and programming of the invasive software vendor. Operational bypasses 512 may delete 507b or patch 508b, or both, in order to provide seamless operation while actually redirecting pointers, spoofing moles and reporters, returning necessary directional codes, and so forth.

In general, counter-invasive software suites 500 may include the ability to prevent operation, prevent successful operation, uninstall, or simply disable the appropriate coding of invasive software. In general, one may think of counter-invasive software 500 as software formulated for the purpose of protecting computer systems of users who may inadvertently load invasive software. A principal function of counter-invasive software systems 500 may ultimately be the surgical disabling of selected lines of code identified by programmers of the software suite 500, in order to maintain the legitimate operating system operation or other software package operation in the purchased software. This occurs while deleting successfully the invasive effects or harms thereof. Meanwhile, the software suite 500 may be counter-invasive by defeating the protections that ensconce the invasive software instructions within the legitimate software purchased.

Figure 16:
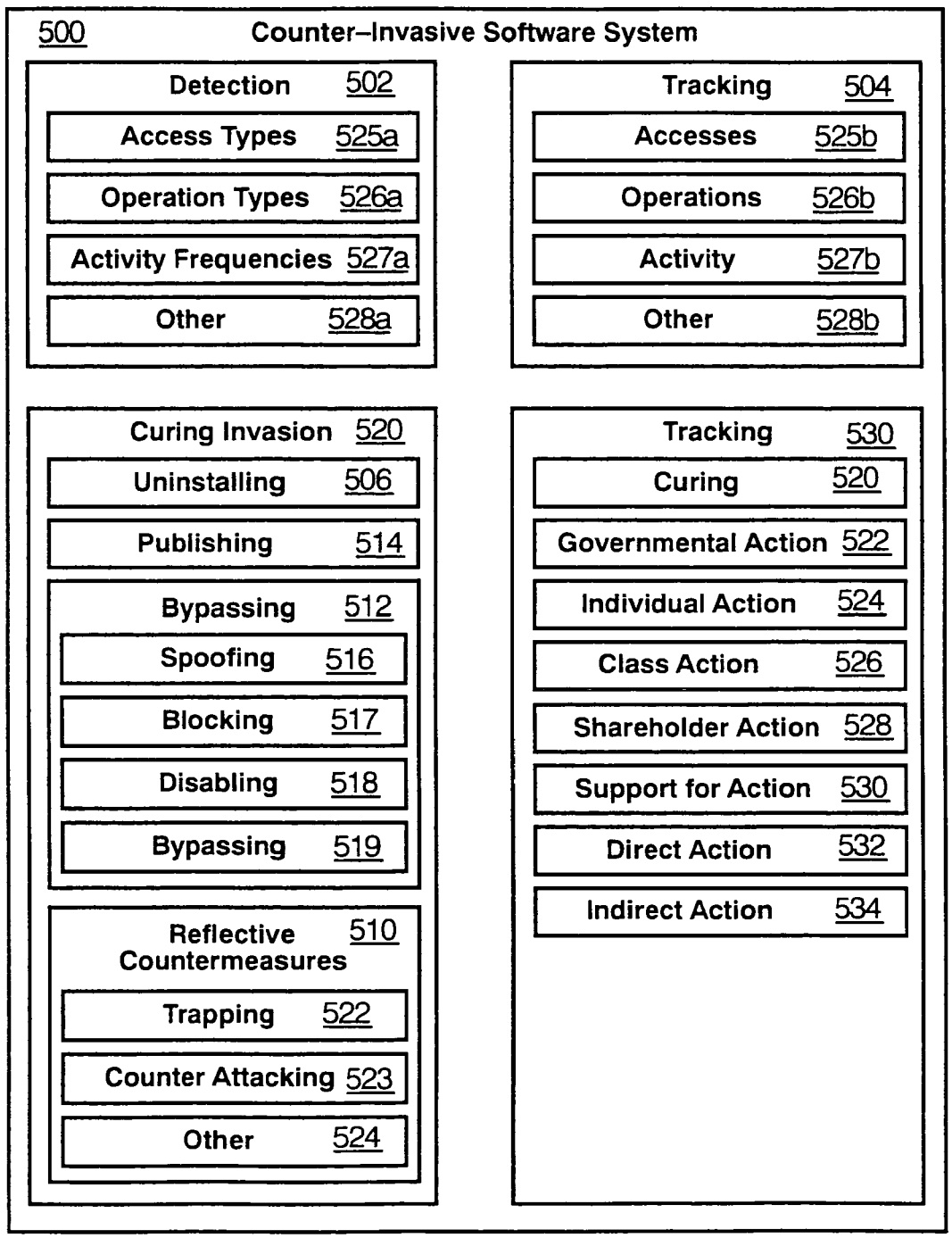
FIG. 16 is a schematic block diagram of one embodiment of various modular portions of a counter-invasive software system in accordance with the invention.

Referring to FIG. 16, a counter-invasive software system 500 may include detection modules 502 of various types. For example, a detection module 502 may include an access type module 525a for determining the types of access used by invasive software and tracking the same.

Similarly, a module for operation types 526a may detect various operations that appear suspicious when viewed in the context of invasive software. Similarly, activity frequencies modules 527a may detect frequencies of operations or activities that tend to indicate a signature consistent with invasive software's presence. Similarly, other modules 528a may be used to detect any other characteristic by which invasive software operation or installation may be detected.

Tracking modules 504 may include one or more modules for tracking behavior of various executables in a software package. For example, a tracking module 504 may include access modules 525b that are responsible for recording and creating historical records of the various accesses made by a software package. Various operations may be tracked by operations modules 526b recording and databasing the types of operations conducted. Similarly, activity modules 527b may create and maintain records of the various activities that are conducted by software, including various calls and commands to the operating system, and the like.

In general, other modules 528b may track operation of software in order to create and maintain records of any activity that may provide a characteristic signature helpful in identifying or defeating invasive software and its handlers. Thus, in general, a tracking module 504 may include as many modules 525, 526, 527, 528 as required or useful to be effective in creating and maintaining records that tend to identify software and manufacturers or sellers as being of an invasive type.

At least two major modules may provide executables effective for curing invasion 520 and for remedying harms 530. For example, steps or methods for curing 520 an invasion by invasive software may involve uninstalling modules 506 for partially or completely uninstalling invasive software, or modules associated therewith and deemed inappropriate and invasive.

Similarly, a publishing module 514 may simply publish information to other users, the public, and so forth in order to make others aware of the nature of invasive software. The very nature of surreptitious invasive software is the lack of understanding by the public. Nevertheless, advertising is a powerful medium and publishing modules 514 may or may not be effective by publishing information over the internet regarding invasive tactics and details of various invasive software.

A bypassing module 512 may include a spoofing module 516 to spoof invasive software into believing that it has been operating properly. Similarly, while vilifying data is collected, controlling software at the site of or site controlled by an invasive software vendor may need to be spoofed into believing that the invasive software is operating properly. In other embodiments, or even in the same embodiments, blocking modules 517, disabling modules 518, bypassing modules 519, or the like may be used alone or in combination in order to respectively block the function, disable the function, or simply bypass the function. This may be done by an appropriate set of commands, deletion of commands, patches, and the like. Programmers analyzing invasive software might find straightforward mechanisms for effecting a bypassing module 512 effective to bypass the operation entirely or effective operation intended by invasive software creators.

Reflexive countermeasure modules 510 may include trapping modules 522, counterattacking modules 523, and other modules 524. Trapping 522 may be thought of as software effective to document a pattern of invasive behavior. It may effectively collect information adequate to identify the operation of invasive software and the source thereof. Trapping modules 522 may operate to use any of the suitable curing methods 520 in order to effectively document the invasions of an invasive software product.

Similarly, other modules 524 may be created for appropriate reflexive countermeasures back against the invasive software module or the source thereof. In certain embodiments, governmental agencies may have the authority to provide counterattacking modules 523 that are effective either to neutralize the effects of the invasive software, or attack the sources thereof or the users thereof. In general, trapping modules 522 may be the most appropriate since they may be thought of as employing defensive measures and self-incriminating measures against software vendors and creators who have sent forth invasive software.

Remedying harm 530 may include a variety of activities sharing certain steps corresponding with the curing processes 520. For example, curing 520 may be one remedy. Remedying 530 by curing 520 the effects may not result in any retribution, accounting, or even identification of a source, distributor, creator, or the like of invasive software. Nevertheless, curing 520 an invasion of invasive software at least dispenses with the problem. In other processes, remedying 530 may include governmental action 522 including criminal prosecution by governmental entities, government lawsuits, government regulatory activities, and the like.

In addition to governmental action 522, individual actions 524 may include legal recourse by individuals who have been harmed by the activities associated with installation, execution, or both, of invasive software. Individual actions may be brought by individuals who believe that their information has been compromised by the operation of invasive software. Individuals and companies owning computers that are hosting invasive software may have a cause of action on their own behalf. Similarly, professionals having responsibilities to clients, which professionals have stored client information on the computers at their professional offices, may have a cause of action individually or collectively. Clients may have a cause of action against unknowing users and knowing producers of invasive software.

A class action 526 is another potential remedy 530 that may be executed by either groups of individuals whose computers are hosting invasive software, or on behalf of groups of individuals and entities whose information has been compromised by the installation of invasive software on the computers of servicing professionals. That is, for example, a health maintenance organization, hospital, doctor, lawyer, CPA, engineer, architect, or the like may host information that is effectively the property of a client. Breach of the confidentiality of the computer system of such a professional may constitute breach of confidentiality obligations by the license professional as owed to clients. Accordingly, a group of clients may file a class action 526 against both the professional hosting the invasive software through a license agreement, as well as against the manufacturer, developer, distributor, or a combination thereof, responsible for providing and accessing the invasive software.

As described hereinabove, a shareholder action 528 may be maintained against a party liable for breaches of confidential information. The shareholder action 528 may operate using any or all of the steps described hereinabove for shareholder actions. A third party purchasing stock may bring a shareholder derivative action or other action, and may provide notification, creating an obligation by a Board, management or the like to report to shareholders on the exposure of a company liable for breaches of confidentiality, and the Other remedies 530 may include support 530 by an independent third party for others bringing actions against invasive software providers or professionals using invasive software. As a practical matter, many professionals hosting invasive software may be completely unaware of the nature of the operation and the nature of the breaches resulting from operation of invasive software. In fact, this may be the gist of a license agreement that purports to obtain consent for operation and installation of invasive software on a computer.

Execution of a license requires only a click on a software button on a computer screen. Licenses have become pass. Individuals do not carefully read license agreements, imbedded terms obscured in the more-or-less conventional text may purport to obtain consents 476. An individual installing software is unlikely to read and study the license agreement, and is unlikely to fully understand the implications thereof. Accordingly, it may not be practical for every individual to ascertain exactly the extent of invasive software.

Many individuals rely on the "plug-and-play" support of software and hardware designers in order to minimize the actual depth of understanding required by an installer or operator of software. Nevertheless, individuals who do have sophisticated skills and knowledge with respect to software and hardware may evaluate newly published software, testing and probing to determine whether or not invasive executables are being installed. Accordingly, a third party may provide support by testing software prior to installation, testing installations of invasive software, and alerting purchasers and users of the invasive nature of software. Support 530 provided by third parties may actually provide the evidence and the ability to collect evidence on behalf of the parties actually harmed by invasive software.

The various remedies 530 that may be relied upon may include both direct action 532 of a harmed party against a party perpetrating the harm. Similarly, indirect actions 534 may be taken. Direct action 532 and indirect action 534 may regarded in different contexts. For example, the harm itself may be direct or indirect, and the action may be taken directly or indirectly against a party, and the action may be undertaken directly or indirectly with respect to the beneficiary of the action.

For example, action may be taken directly 532 against a supplier of invasive software. Likewise, action may be taken directly 532 against a professional whose computer system uses invasive software to the detriment of a client.

Indirect action 534 may be taken against a professional in an attempt to induce the professional to file a direct action 532 on its own behalf for indemnification against a supplier of invasive software. Similarly, a shareholder may file a direct action 532 against a corporation for the breach of fiduciary duty by the corporation due to a failure to remedy 530 the problem being created by hosting invasive software on the corporate computers. A corporation may file an indirect action 534 against an installer in order to induce an installer to take action or join in a class action against a provider of invasive software provided by the installer to a location of the complaining entity.

A beneficiary may be direct or indirect with respect to a cause of action. For example, a professional may maintain an action against a provider of invasive software on the basis of a direct action 532 based on harm to the professional organization. Alternatively, one may rely on an indirect action 534 based on the harm that the invasive software has caused a professional organization to be responsible for in the breach of confidentiality as to the professional organization's client information.

Figure 17:
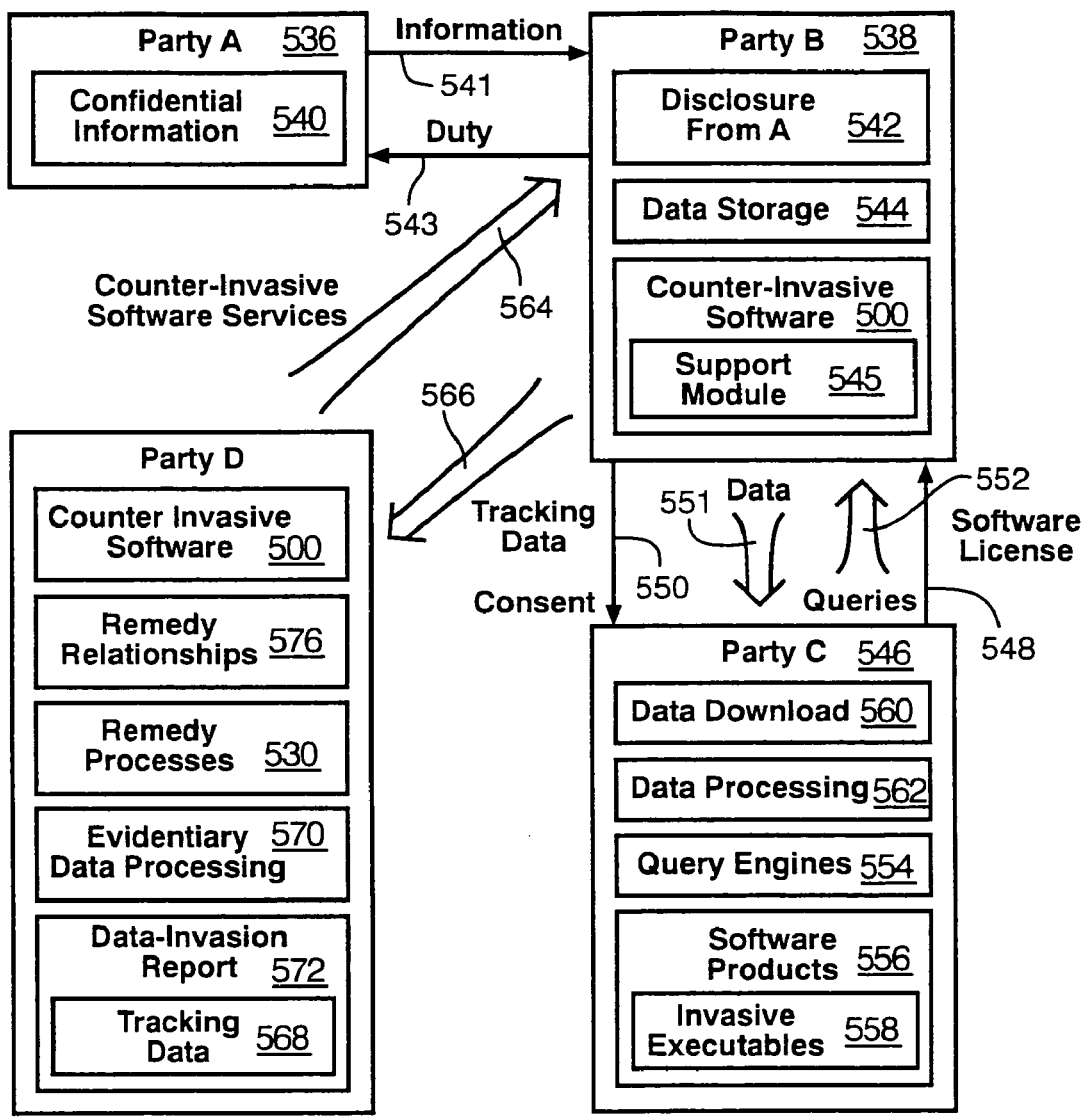
FIG. 17 is a schematic block diagram of a system and process for defeating the objectives and attempts of invasive software to breach duties of software users to clients and others.

Referring to FIG. 17, counter-invasive software 500 may be operated as part of an overall system to insulate parties from harm, protect against harms, and remedy harms. For example, in one embodiment, a party A 536 may possess confidential information 540. Confidential information 540 may be transferred 541 to another party B 538 through a disclosure 542 from party A 536. As described hereinabove, the disclosure 542 of the confidential information 540 may result in data storage 544 on a computer owned by party B 538. Due to the relationship between party A 536 and party B 538, a duty 543 may exist obligating party B 538 to maintain in confidence the confidential information 540 of party A 536. In order to satisfy the duty 543 or discharge the duty 543 by which party B 538 is obligated to party A 536, party B 538 may install counter-invasive software 500 or execute a counter-invasive software system 500 for protecting against and remedying harms that may arise from invasive software installations.

In general, a scenario may begin with a party C 546 providing 548 a software license for execution by party B 538 to install and operate the software. In return, in addition to purchasing the software license 548 or purchasing the transfer 548 of the software license, a party B 538 may provide a consent 550 to party C 546. The consent transfer 550 or the transfer 550 of a consent 476 or contract acceptance 424 ultimately results in a completed installation and operation of the invasive software on a computer corresponding to party B 538.

Following installation of the invasive software on a computer corresponding to party B 538, by party B 538 or on behalf of party B 538, party C 546 may send queries 552. The queries 552 may originate in query engines 554 maintained and operated on behalf of party C 546. The query engines 554 may be imbedded in the software products 556. In other embodiments, a software product 556 may be provided with the transfer 548 of the software license. Certain invasive executables 558 designed to cooperate with the query engines 554 may be installed on the computer system of party B 538 then or thereafter.

In response to the queries 552, the invasive executables 558 now installed with the software products 556 on the computers of party B 538 may send back data 559 to party C 546. The return response 559 or data 559 returned to party C may then become part of a database 560 or other data 560 downloaded by party C 546 from various parties 538.

Party C 546 may typically use data processing 562 of its own design in order to harvest from the downloaded data 560 information that may be of use to party C 546. The downloaded data 560 may be mined to obtain profiling information with respect to party B 538, or may be used for other less benign purposes.

One of the major dangers of software products 556 embodying invasive executables 558 is that the difference between the software products 556 and attacks by crackers (illegal and harmful hackers) only seems to vary in the extent of the damage, and in the existence of the consents 476 transferred 550 by party B 538. Nevertheless, whether or not the transfer 550 or the extraneous consents 476 were actually given knowingly by party B 538 is or may be in serious question.

In certain embodiments, counter-invasive software systems 500 may be installed by a party B 538 in order to defeat the query engines 554 of party C. That is, for example, the counter-invasive software system 500 may neutralize the invasive executables 558 as described with respect to FIGS. 11-16. Nevertheless, in other embodiments, a party D 563 may provide several services to party B in order to effectively counter the invasive executables 558.

For example, a counter-invasive software system 500 may be installed by party B 538 in a computer independent from those of party B 538. Communication between computers of party B 538 and party D 563 may cooperate by communicating certain information. Party D 563, or computers thereof, may host counter-invasive software systems 500. In such an embodiment, a party D may transfer 564 counter-invasive software services or may actually transfer counter-invasive software systems 500 to party B 538 for installation.

In certain embodiments, counter-invasive software services 564 may be transferred 564 or provided 564 to party B 538 remotely, being serviced by a counter-invasive software system 500 hosted by party B 538 remote from party B 538. In such an embodiment, party D and the counter-invasive software system 500 may collect or receive 566 tracking data 568 provided by party B 538 by way of executables 500 provided by party D 563 to party B 538.

Party D may provide more sophisticated and centralized services such as processing 570 of evidentiary data that may be deduced or obtained otherwise from the tracking data 568 received 566 from party B 538 and the computers thereof. Accordingly, the processing 570 may result in are port 572 identifying the nature and extent of data invasion by the invasive executables 558 installed by party B 538. Similarly, the evidentiary data processing 570 may also provide are port 572 detailing the extent to which queries 552 have attempted to obtain data transfers 559 but were defeated by the counter-invasive software system 500.

Party D 563 may also provide additional services by modifying the invasive executables 558 through some remedy process 530. Likewise, party D 563 may coordinate other more global remedy processes 530, such as the remedies 530 illustrated in FIG. 16. That is, to some extent the remedy processes 530 may include curing 520 the intended harms to be perpetrated by the invasive executables 558, as well as the possibility of remedying 530 the global harms to party B 538, clients of party B 538, or both.

In certain embodiments, a support module 574 may be installed in a computer of party B 538 in order to cooperate with the computer system of party D 563. The support module 574 may include the entire capability of the counter-invasive software 500, or may simply be a support system 574 providing interaction with a remotely located counter-invasive software system 500 hosted by party D 563 remotely from party B 538.

In certain embodiments, party D 563 may undertake to remedy 576 relationships. That is, certain processes may be required in order to remedy 576 relationships between party B 538 and, for example, clients such as party A 536. To remedy 576 relationships may require negotiations, coordination, and the like, in order to maintain party B 538 and party the same side of the table with respect to defeating, undoing, and remedying 530 the harms of party C 546 thereto.

Figure 18:
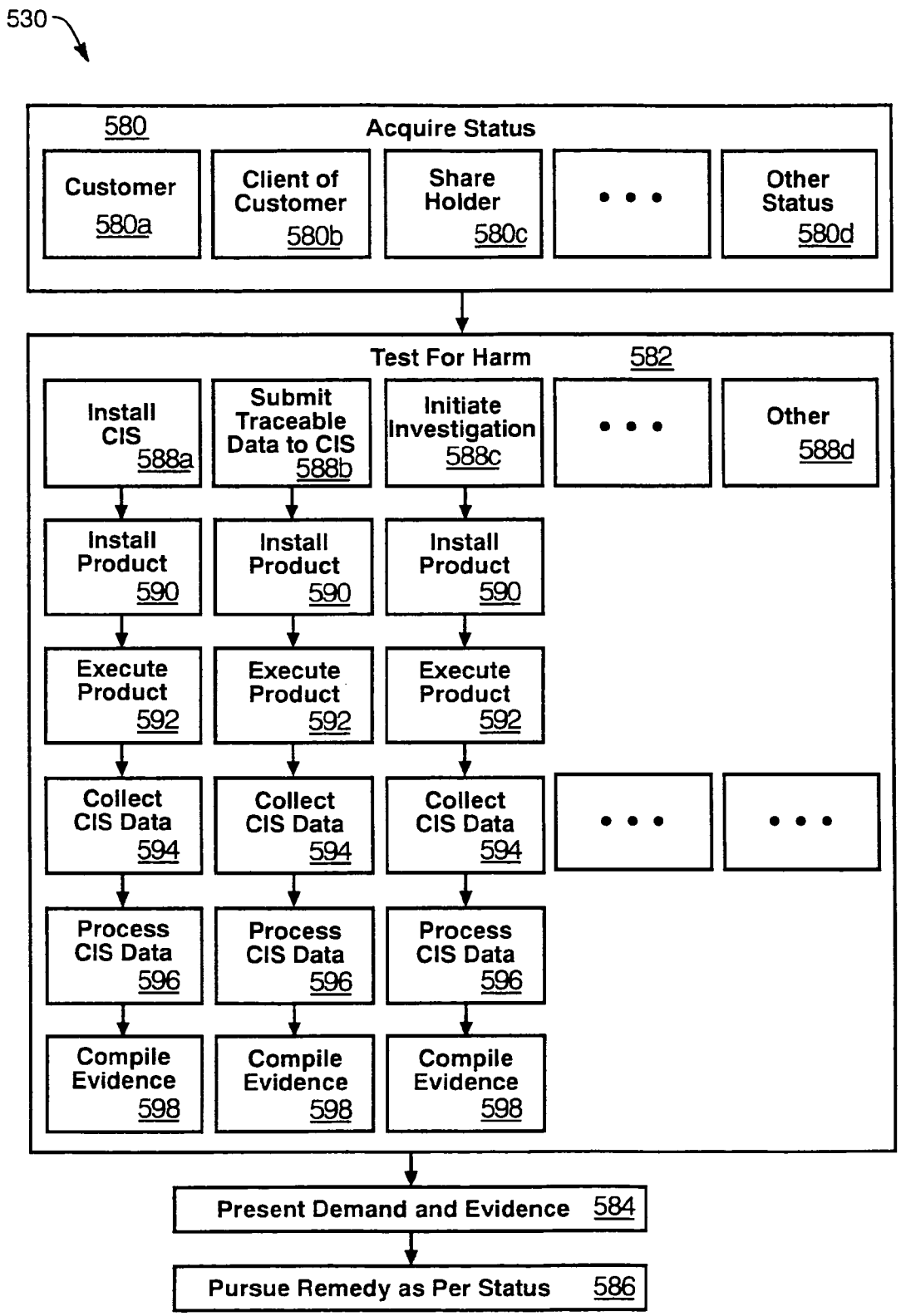
FIG. 18 is a schematic block diagram of various alternative embodiments for implementing counter-invasive software systems in accordance with the invention.

Referring to FIG. 18, a process 530 for remedying harm may include various embodiments. For example, in one embodiment, a process 530 for remedying harms may include acquiring 580 a suitable status. That is, for example, some causes of action are available to customers, some to competitors, some to shareholders, and so forth. For example, a customer status 580a may be acquired by purchasing software products 556 in the first place. Similarly, any individual may acquire 580 the status of a customer 580 a by suitable acts of purchasing services or goods.

Similarly, an individual or organization may acquire 580 a client status 580b or shareholder status 580c. In general, any other status 580d that may be useful may be acquired by an injured party in order to establish the duty owed by a party C 560 distributing software products 556 containing invasive executables 558.

At some point, either before or after acquiring 580 an appropriate status, a test 582 may be conducted as to what harms have been committed. For example, an aggrieved party may, for example, initiate 588 the test 582 by taking steps required in order to install 590 the software products 556 in question. Initiation 588 may include installing 588a a counter-invasive software system, in order to either cure 520 the invasive actions of the invasive executables 558, or simply to maintain the cause of action by subjecting oneself to the harm thereof.

Similarly, one may submit 588b traceable data to a counter-invasive software system 500 that is already installed. In other embodiments, an aggrieved entity may initiate 588c an investigation of facts or information giving rise to a cause of action for harms previously done. Other steps 588d may also be used to initiate 588 a test 582 for harm. In many embodiments, initiation 588 may be followed by an installation 590 of the software products 556 containing the invasive executables 558.

Upon execution 592 of the products 556, collecting 594 of the data, such as tracking data 568 by a counter-invasive software system 500 may provide the necessary raw information for processing 596. Processing 596 of the counter-invasive software data, such as the tracking data 568 may be thought of as an embodiment of evidentiary data processing 570. The processing 596 may occur within a computer owned by, controlled by, or serving party B 538, or an independent system 500 owned by, controlled by, or in service of party D 563.

Through the continuing and often repeated processes of continuing the execute step 592, the software products 556, may continue to be executed 592 therewith. Accordingly, either the actual harmful activity, or detection of the attempts by the invasive executables 558 to complete harmful acts will be tracked. Collecting 594, processing 596, and those associated tasks required to store and process 570 this information result in a compiling 598 of data. This data provides evidence against the purveyors, such as party C 546, of the software products 556 regarded as invasive software products 556.

An aggrieved party B 538 may thus present 584 on its own, or in conjunction with a party D 563, or a party D 563 may present 584 on behalf of all those situated as party B 538, a demand along with evidence compiled 598 against party C 546 responsible for distributing the invasive software products 556.

Depending upon the reaction of the offending party C 546, the harmed parties 536, 538, 563, either alone, together, or in any particular arrangement that is appropriate, may pursue 586 a remedy according to the status thereof. For example, competitors have unfair trade competition regulation protecting them from inappropriate activities by those in commercial competition therewith. Similarly, customers have certain protections as consumers or industrial customers.

A party A 536 served by a professional entity as party B 538 may have a cause of action against party B 538 for breach of duty. It may have another cause of action against party C 546 resulting from installation of invasive software products 556 and subsequent transfers 559 of confidential information 540.

Figure 19:
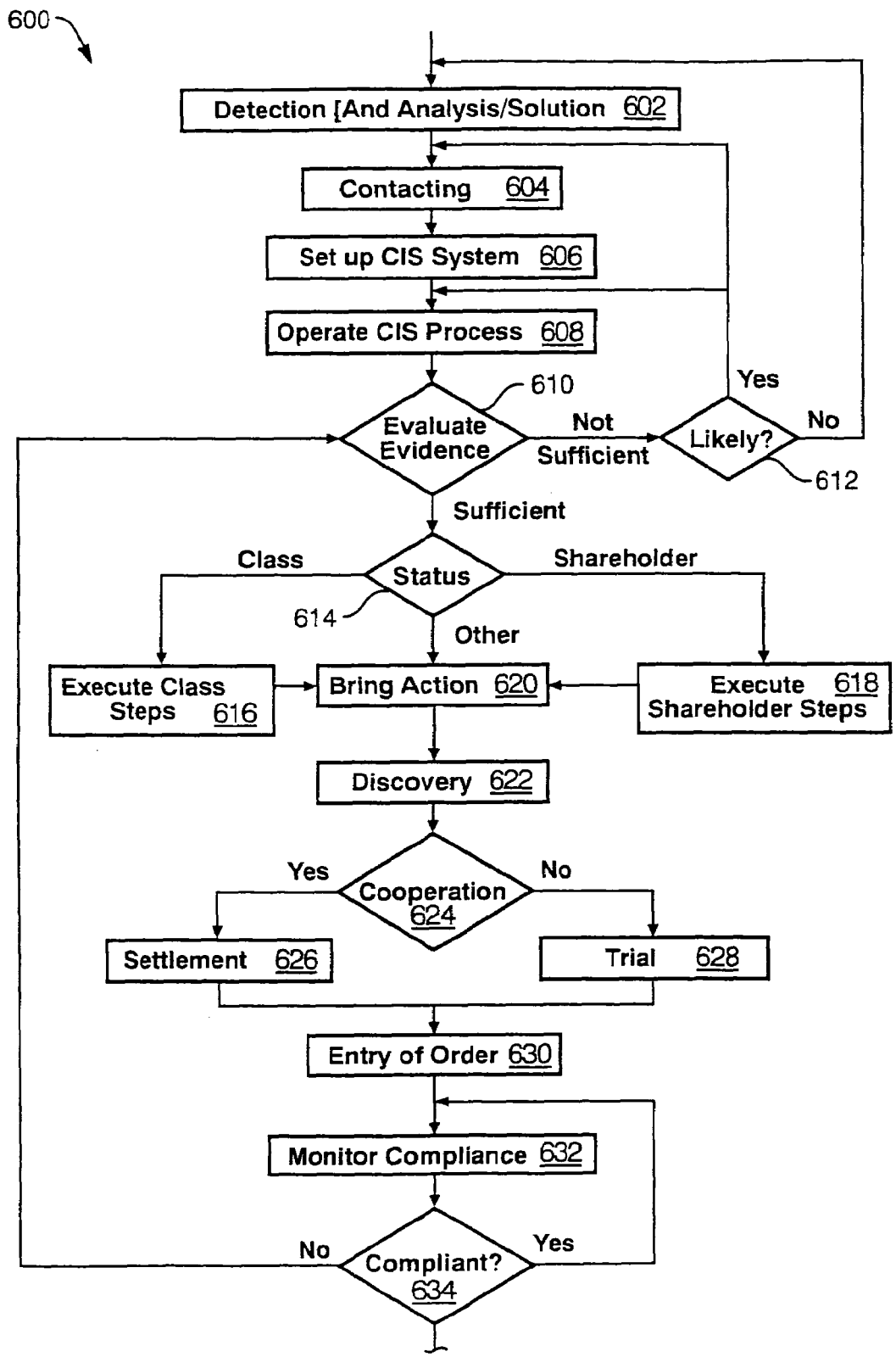
FIG. 19 is a schematic block diagram of one process for defeating invasive software and those who rely on it.

Pursuing 586 remedies according to the status of an aggrieved party may be conducted by any of the methods discussed hereinabove. For example, shareholders and other aggrieved parties may have various types of remedies that can be pursued 586 in accordance with the apparatus and methods described in FIGS. 1-10, and FIGS. 11-17. Referring to FIG. 19, detection 602 may include identifying relationships between various parties 536, 538, 546, 563, as well as determining the flow of software products 556 deemed to be invasive. It may include other gathering of information to determine the intent and effect of the invasive software products 556.

For example, optionally, analysis or even development of a solution for curing 520 the harms intended by invasive executables 558 may be conducted. This may be done by a party B 538 purchasing software products 556, or an other party D 563 attempting to provide a public service or commercially available product.

Within a detection step 602, a party C 563 or party B 538 may investigate how a particular invasive executable 558 operates, how it can be tracked. One may identify the types of locations and types of information that are relied upon thereby. One may identify methods for security or operation of executables 558 and schemes be which they may be defeated, spoofed, or otherwise cured 520 in order to render the invasive executables 558 inoperable or ineffective.

After detection 602, contacting 604 various parties may be appropriate. For example, announcing the issues, announcing to the public through the Internet, newspapers, trade publications, and other mechanisms, the nature of the invasive executables 558 or the like may identify to an aggrieved party A 536 or endangered and aggrieved party B 538 the nature of the problem. Contacting sellers of software 556, users, and the like may occur in any manner currently available through market advertising, or public service announcements.

Certain suppliers of software products 556 may be very interested in knowing that the software 556 that they are reselling is invasive in order to limit their liability. Accordingly, contacting 604 may obtain a great amount of support by various interested parties. Similarly, contacting 604 may be delayed by parties who are afraid that they have liability, and accordingly choose to ignore the detection 602 of invasive executables 558.

In order to solve the problems caused by invasive executables 558, setting up 606 a counter-invasive software system may be done as explained hereinabove. For example, the setup 606 of counter-invasive software systems 500 may involve the computers of a user 538b or a remote service provider party D 563, who has been subjected to the invasive software product 556.

As discussed, operating 608 the counter-invasive software system 500 to obtain the benefit of its various processes of tracking, such as might be required in order to trap 522 a party C 546 may provide tracking data 568. Tracking data 568 may help in identifying the nature and extent of invasion by invasive executables 558. Typically, operating 608 may include transfers such as transfers 564 of services or software, and transfer 566 of tracking data 568. Processing 570 and generation of data invasion reports 572 may then be effective to trap 522 offending parties 546.

Thus, continuing to collect, analyze and report offensive activities by invasive executables 558 may be embodied in the operating 608 process of the counter-invasive software system 500.

Eventually, a test 610 may require evaluating 610 evidence provided by the operating 608 of the counter-invasive software system 500. If evidence is insufficient, then a test 612 for the likelihood that a party C 546 is improperly invading or improperly providing invasive executables 558 may result in moving on to another party C 546 with an initiation of the process 600 beginning at detecting 602 an invasive software product 556.

On the other hand, what if the test 612 determines that the evidence is not sufficient, but nevertheless indicates that a likelihood exists that an offending party C 546 is providing invasive executables 558? Then the process 600 may return to either contacting 604 additional aggrieved parties, continuing to operate 608 the counter-invasive software system 500 to obtain more information or better information, or both. Ultimately, the test 612 will result in the evaluation 610 providing sufficient evidence, or the process 600 will move away from a particular targeted party C 546 to other parties 546 that may be offending.

A test 614 may determine the status of an aggrieved party B 538. In some embodiments, a party D 563 may have initiated 588 steps to test 582 for harm, and may have acquired 580 a status giving it a cause of action against party C 546. In other embodiments of a process 600, an aggrieved party B 538, or a damaged party A 536 may already be within a particular class qualified to execute 616 class steps.

Similarly, a shareholder, or a party D 563 that has become a shareholder, or even a damaged party A 536 that has become a shareholder, may execute 618 the shareholder's steps as described hereinabove. That is, class action steps and shareholder steps have been described in detail hereinabove and may be executed 616, 618, by those desiring the appropriate status in order to bring an action 620. Meanwhile, other steps may be executed to bring an action 620 under other bases. The process of bringing 620 an action may involve or invoke any of the processes and procedures described hereinabove.

Meanwhile, discovery 622 following bringing 620 an action, may result in a variety of reactions. A test 624 may be thought of as determining 624 whether an offending party C 546 elects to be cooperative or not. If a party chooses to be cooperative, then a settlement process 626 may be appropriate. If not, a trial 628 may be appropriate.

In either event, entry 630 of an order should be appropriate. In settlement 626, a contractual arrangement may actually be substituted as the terms of an order, followed by an order of dismissal, or may become the terms recited upon entry of an order 630. That is, in general, a court order is an appropriate document to be entered 630 to close an action 620. If settlement 626 results in a contractual arrangement, a court will often enter 630 an order adopting or memorializing the agreement as a closure of the case. In other cases, parties contract and then agree to a dismissal order.

After entry 630 of an order, monitoring 632 compliance of party C 546 with the substance of the order, may result in compliance or non-compliance. Accordingly, a test 634 may be thought of as determining whether or not party C 546 is in compliance or not. If party C 546 remains in compliance, then monitoring 632 continues and the remedying 530 continues in accordance therewith.

If, on the other hand, party C 546 falls out of compliance, then the process 600 may result in returning to the evaluation 610 of the evidence extant. Again, the entire process 600 may optionally be ratcheted back to its beginning with detection 602, or any intermediate step may be taken, in order to enforce compliance in accordance with the entry 630 of the order.

Figure 20:
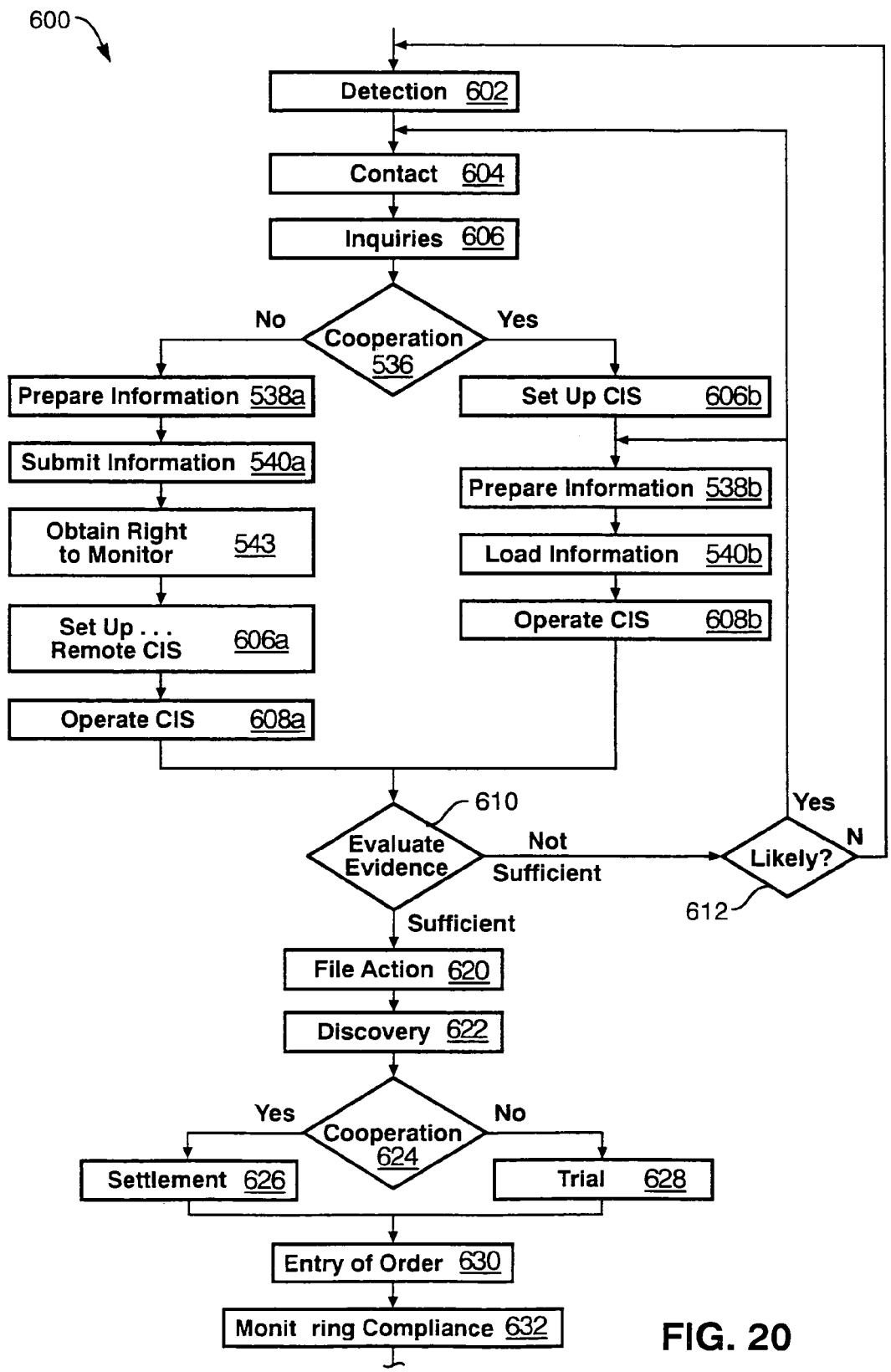
FIG. 20 is a schematic block diagram of alternative embodiments of processes for implementing a counter-invasive software system and a process for defeating purveyors of invasive software.

Referring to FIG. 20, a process 600 may include detecting 602 and contacting 604 as described with respect of FIG. 19. However, inquiries 605 may be conducted in order to determine on behalf of a party A 536 whether or not Party A 536 has been harmed by a party B 538 being invaded by software of a party C 546. That is, in the example of FIG. 19, a party B 538 may set up 606 and operate 608 a counter-invasive software system 500. In the embodiment of FIG. 20, an aggrieved party A 536 may make inquiries 605 to a party B 538, to determine whether or not party B 538 may possibly have compromised the confidential information 540 of party A 536 by allowing improper access to party C 546. Again, a test 536 may be thought of as a determination as to whether a party B 538 or a party C 546 has been cooperative in responding to inquiries 605. In some embodiments, the inquiry 605 may be conducted by a party D 563 more innocuously than inquires from party A 536. That is, an independent party D 563 may be able to make determinations more easily than an aggrieved party A 536.

By whatever mechanism, a party B 538 may be cooperative or not. However, an alternative mechanism exists in which a party conducting inquiries 605 may not want cooperation. That is, for example, a party A 536 may actually not contact a party B 538, and may prefer to investigate potential attacks on party B 538 by party C 546, independent from, rather than in cooperation with, party B 538 whose data storage 544 is being accessed by queries 552. Thus party A 536 may prefer not to cooperate with party B 538.

If cooperation is not sought or received from a party B 538 under attack, then a party A 536 or an engaged party D 563 on behalf of party A 536 may prepare 538a selected information. Accordingly, the information may be submitted 540a with a transfer 541 as discussed above. In certain circumstances, an independent party D 563, such as a government agency or the like, or perhaps even an independent party, may need to obtain 542 a right to monitor computer traffic 552, 559 of party B 538. That right may require a wiretap, consent of particular commercial parties, or the approval of other government agencies. Typically, a court order authorizing wiretapping, or the commercial approval of an entity having control party B 538 may be required.

After obtaining 542 the ability and right to monitor exchanges of data, a party D 563 or party A 536 may set up 606a a remote counter-invasive software system 500. That is, the counter-invasive software system 500 may be remote from its operator, party A 536 or party D 563, or the system 500 may be remotely located at a location of party A 536 or party D 563, or at a location remote from the monitored system of party B 538 or the system of party C 546.

If party A 536 or party D 563 is working on a cooperative basis with the attacked party B 538, then setting up 606b a counter-invasive software system 500 may be done in any suitable manner as discussed above, or otherwise. Accordingly, information may be prepared 538 B in order to provide dummy examples of confidential information 540, that may be earmarked, contain signatures, codes, and the like, in order to be tracked if taken from the data storage 544 of a party B. Accordingly, loading 540b the prepared information into the data storage 544 may then provide a mechanism for tracking any transfers 559 to download a data 560 by party C 546. Thus, operating 608b the counter-invasive software system 500 may produce tracking data 568 return to either party A 536, party B 538, or independent party D 563 operating on behalf of party A 536 or party B 538.

Ultimately, a test 600 may evaluate or determine whether or not evidence is sufficient to support a remedy. A test 612 determines whether or not it is likely that either part B 538 or party C 546 is coordinating and transferring 559 information by way of invasive executables 558. If so, then a test 612 may determine whether or not it is likely that either party B 538 or party C 546 is in fact invading the data storage 544 or breaching the duty transferred 543 to party A 536. If this is likely, although currently insufficient, evidence may be augmented by preparation 538b of additional information, or contacting 604 other potentially aggrieved parties.

The initial evidence may appear to be not only lacking, but to point to an unlikelihood that party B 538 or party C 546 is indeed breaching any duty or invading any rights. Then, the process 600 may be directed toward another party C 546 with initiation of detection 602 of software products 556 containing invasive executables 558.

If, on the other hand, the test 610 determines that the evidence collected is sufficient to give rise to a cause of action by an aggrieved party, such as a party A 536, then filing 620 an action may be appropriate, followed by discovery 622, as discussed above. Typically, cooperation may be determined in a test 624 after which either a settlement 626 or trial 628 may result in an entry 630 of an order. Monitoring 632 and the like as described with respect to FIG. 19 may then be in order.

The present invention may be embodied in other specific forms without departing from the essential characteristics thereof. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for countering invasive software activity, the method comprising:
    detecting invasive executables in a software system;
    installing a counter-invasive software application (CISA) to create evidence of invasive activity conducted as a result of the invasive executable;
    taking remedial action against an obligor to obtain an obligation therefrom; and
    monitoring compliance by the obligor with respect to the obligation.

2. The method of claim 1, wherein the software system is provided by a supplier and hosted by a service provider.

3. The method of claim 2, wherein the obligor is at least one of the supplier and the service provider.

4. The method of claim 2, further comprising contacting at least one of the supplier and the service provider to obtain cooperation in defeating the invasive executable.

5. The method of claim 4, further comprising motivating at least one of the supplier and service provider to provide a solution for defeating the invasive executable.

6. The method of claim 5, further comprising motivating at least one of the supplier and service provider to develop the solution.

7. The method of claim 1, further comprising motivating the obligor to provide a solution rendering ineffectual the invasive executable.

8. The method of claim 7, wherein motivating is the remedial action.

9. The method of claim 2, further comprising installing the CISA on a computer of the service provider.

10. The method of claim 2, further wherein installing further comprises installing the CISA on a computer remote from and not under the control or knowledge of the service provider in order to monitor the service provider for breaches of duty due from the service provider to a client thereof and breached as a result of the invasive executable.

11. The method of claim 2, further comprising providing test information to the service provider, the test information containing a characteristic identifiable to substantiate the invasive activity by the invasive executable.

12. The method of claim 11, further comprising providing the test information without informing the service provider concerning the characteristic thereof.

13. The method of claim 12, further comprising:
collecting evidence of the activity of the invasive software;
evaluating the evidence to determine the adequacy thereof to support a demand for remedial action against at least one of the service provider and the supplier.

14. The method of claim 13, further comprising:
continuing collecting additional evidence;
determining the adequacy of the evidence is sufficient; and
taking remedial action against at least one of the supplier and the service provider.

15. The method of claim 14, wherein at least one of the supplier and service provider is the obligor.

16. The method of claim 1, further comprising developing solution software to mitigate at least one effect of the invasive executable.

17. The method of claim 1, further comprising obtaining a right to monitor activity of the invasive executable on a computer corresponding to a service supplier hosting the software system.

18. The method of claim 1, wherein installing further comprises installing the CISA on a computer corresponding to a party other than the obligor.

19. The method of claim 18, further comprising:
executing the CISA to create tracking data corresponding to the invasive activity of the invasive executable; and
collecting the tracking data to create evidence of the invasive activity.

20. The method of claim 19, further comprising providing, in response to the activity of the invasive software, witness data originating from the CISA to be stored to evidence the origination thereof from the CISA.

21. The method of claim 20, further comprising:
creating by the CISA witness data to be stored to evidence the origination thereof from the CISA; and
providing to a target party, in response to the activity of the invasive software, the witness data.

22. The method of claim 21, wherein the target party is the obligor.

23. The method of claim 21, wherein:
taking remedial action further comprises filing an action against the obligor.

24. The method of claim 23, further comprising obtaining in discovery at least a portion of the witness data.

25. The method of claim 1, further comprising obtaining a status as at least one of a class member, a shareholder, a customer, and a client with respect to a source of the invasive executable.

26. The method of claim 2, further comprising obtaining a status as at least one of a class member, a shareholder, a customer, and a client with respect to at least one of the supplier and the service provider.

27. The method of claim 1, wherein taking remedial action further comprises filing at least one of a class action, a shareholder action, and an individual action.

28. A method for countering invasive software, the method comprising:
procuring an invasive software system (ISS) provided by a supplier and configured to invasively obtain and communicate to the supplier proprietary information from a computer of a user, the proprietary information giving rise to a duty of non-disclosure thereof;
testing the product to determine invasive operation thereof;
developing, a counter-invasive software application (CISA) to do at least one of detecting, ameliorating, and defeating the operation of the invasive software system.

29. The method of claim 28, further comprising motivating a source of the ISS to do at least one of developing a solution effective to provide protection against the invasive activity of the ISS while leaving substantially operational legitimate operations of the ISS and modifying the ISS to render it ineffective.

30. The method of claim 28, wherein the ISS comprises a computer operating system.

31. The method of claim 28, wherein the CISA is programmed to create evidence of invasive activity.

32. The method of claim 28, wherein the CISA is programmed to create tracking data to monitor attempts by the ISS to conduct invasive activity.

* * * * *